(12) United States Patent
Lopez et al.

(10) Patent No.: US 8,650,947 B2
(45) Date of Patent: Feb. 18, 2014

(54) APPARATUS FOR MEASURING THE FLOW RATE OF A FLUID

(75) Inventors: Martin Lopez, Rotherfield (GB); James Hobby, Crowborough (GB); Gary Robert Aylward, Brighton (GB); Bahram Alizadeh, Maidstone (GB)

(73) Assignee: Servomex Group Limited (GB)

( * ) Notice: Subject to any disclaimer, the term of this patent is extended or adjusted under 35 U.S.C. 154(b) by 244 days.

(21) Appl. No.: 13/151,644

(22) Filed: Jun. 2, 2011

(65) Prior Publication Data
US 2011/0296910 A1    Dec. 8, 2011

(30) Foreign Application Priority Data

Jun. 4, 2010 (GB) .................................. 1009444.9

(51) Int. Cl.
*G01F 1/68* (2006.01)
(52) U.S. Cl.
USPC ...................................................... 73/204.27
(58) Field of Classification Search
None
See application file for complete search history.

(56) References Cited

U.S. PATENT DOCUMENTS

| | | | |
|---|---|---|---|
| 3,433,068 A | | 3/1969 | Werner et al. |
| 3,942,378 A | * | 3/1976 | Olmstead .................... 73/204.16 |
| 3,975,951 A | | 8/1976 | Kohama et al. |
| 4,159,638 A | | 7/1979 | Potter |
| 4,319,483 A | * | 3/1982 | Durham et al. ............. 73/204.15 |
| 4,599,895 A | | 7/1986 | Wiseman |
| 4,787,251 A | * | 11/1988 | Kolodjski ........................ 73/755 |
| 5,177,696 A | * | 1/1993 | Bonne ........................... 702/136 |
| 5,237,867 A | * | 8/1993 | Cook, Jr. ..................... 73/204.15 |
| 5,460,039 A | | 10/1995 | Cutler |
| 2001/0039833 A1 | * | 11/2001 | Engel et al. ................. 73/204.27 |
| 2011/0083514 A1 | * | 4/2011 | Naier et al. ................. 73/861.11 |

FOREIGN PATENT DOCUMENTS

DE    4216086 A1    5/1992

OTHER PUBLICATIONS

Search Report dated Oct. 8, 2010 for GB Application No. GB1009444.9, 3 pages.
Corrected Search Report dated Oct. 8, 2010 for GB Application No. GB1009444.9, 3 pages.
Letter requesting voluntary amendment dated May 3, 2012 for GB Application No. GB1009444.9 including correspondence with the EPO for EP Application No. EP11168669.7, 34 pages.
Examination Report dated Jun. 28, 2012 for GB Application No. GB1009444.9, 2 pages.
Notice of Allowance dated Sep. 25, 2012 for GB Application No. GB1009444.9, 2 pages.
Allowed Claims dated Sep. 25, 2012 for GB Application No. GB1009444.9, 7 pages.

(Continued)

*Primary Examiner* — Harshad R Patel
(74) *Attorney, Agent, or Firm* — Daly, Crowley, Mofford & Durkee, LLP

(57) ABSTRACT

Provided is a compact apparatus for measuring the flow rate of a fluid. The apparatus includes a heated measure element and a heated reference element which are in substantially the same thermal environment within a measure cell, except that the measure element is situated in the path of the cooling fluid flow and the reference element is sheltered from this direct fluid flow. These elements are arranged as parallel and concentric planar elements that are essentially identical to each other with matching thermal characteristics. The elements are electrically connected in a Wheatstone bridge arrangement. Thermal exchange between the reference and measure elements is used to optimise noise rejection due to common mode background thermal effects. Measured parameters from the bridge can be used to derive the fluid flow rate.

45 Claims, 25 Drawing Sheets a) Side cross section of sensor    b) Rear cross section of sensor

(56) References Cited

OTHER PUBLICATIONS

EP Search Report and Search Opinion dated Sep. 20, 2011 for EP Application No. EP11168669.7, 6 pages.

Response to Search Opinion dated May 2, 2012 for EP Application No. EP11168669.7, 20 pages.

Office Action dated Nov. 12, 2012 for EP Application No. EP11168669.7, 8 pages.

* cited by examiner

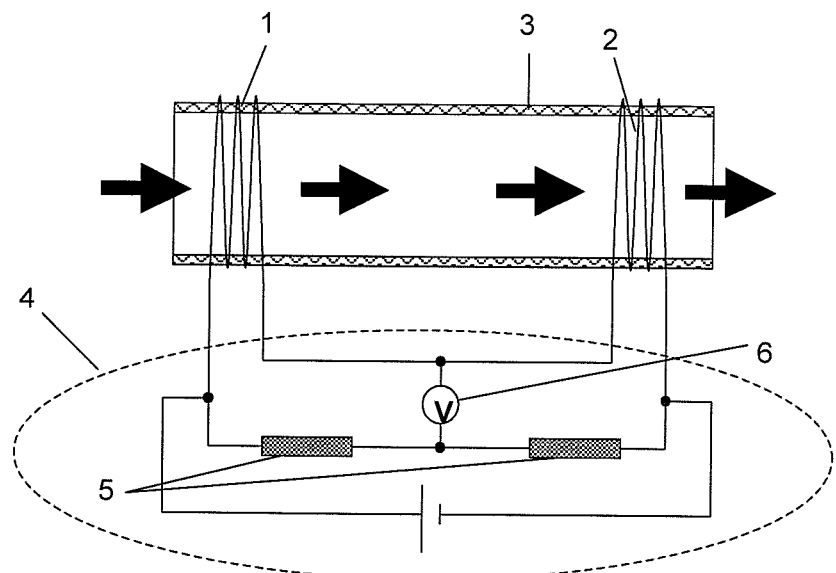
Fig.1: (prior art)
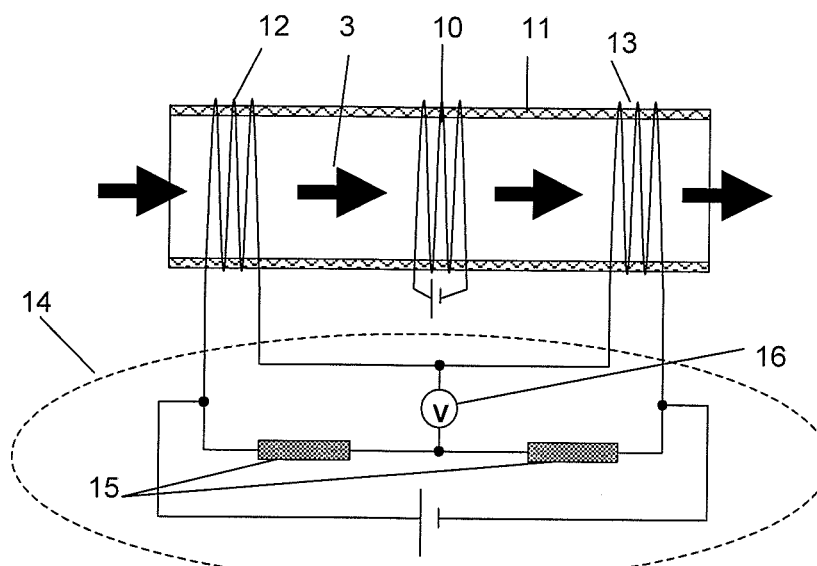
Fig.2: (prior art)

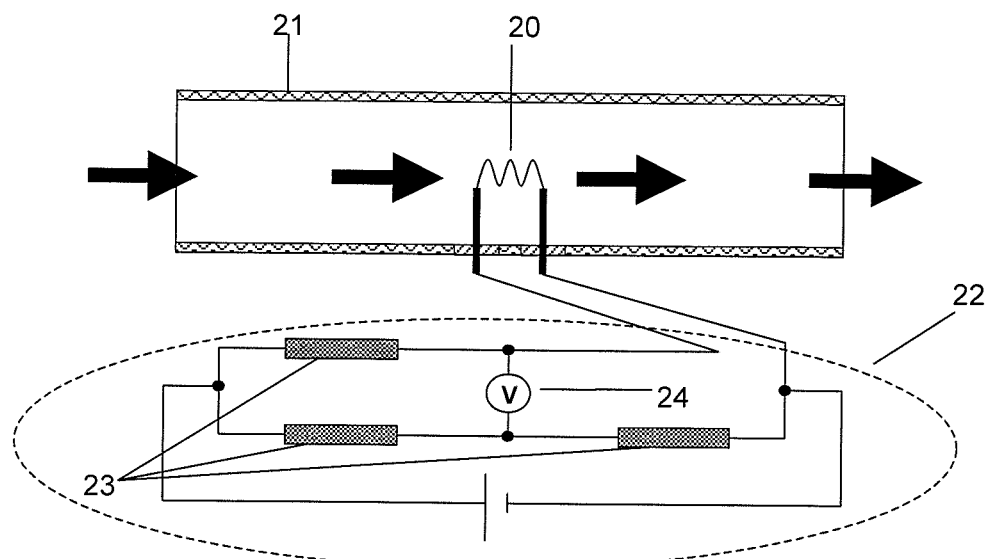
Fig.3: (prior art)
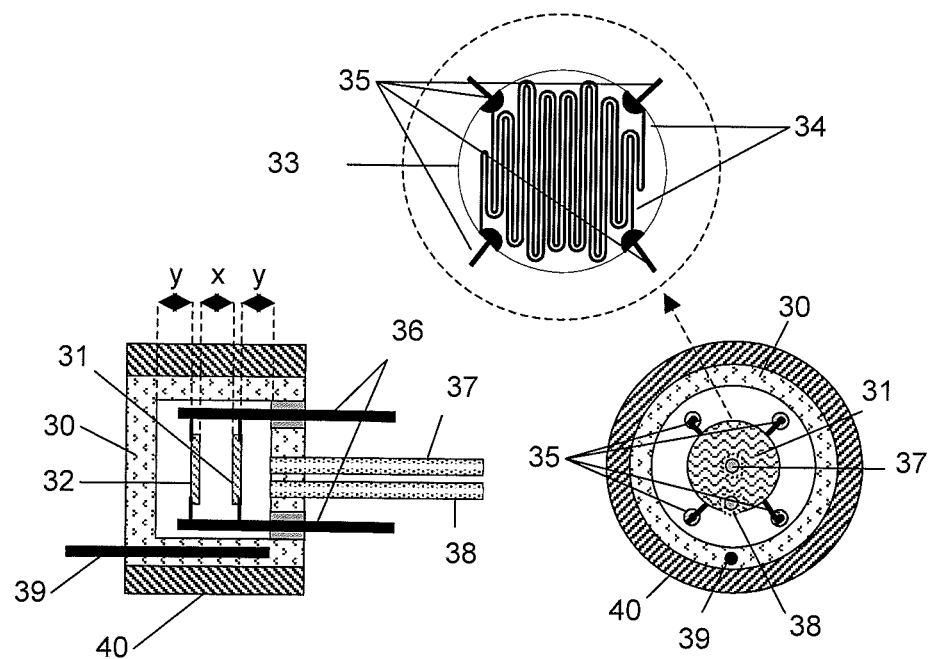
a) Side cross section of sensor     b) Rear cross section of sensor
Figure 4 a) Side cross section of sensor    b) Rear cross section of sensor a) Side cross section of sensor    b) Rear cross section of sensor

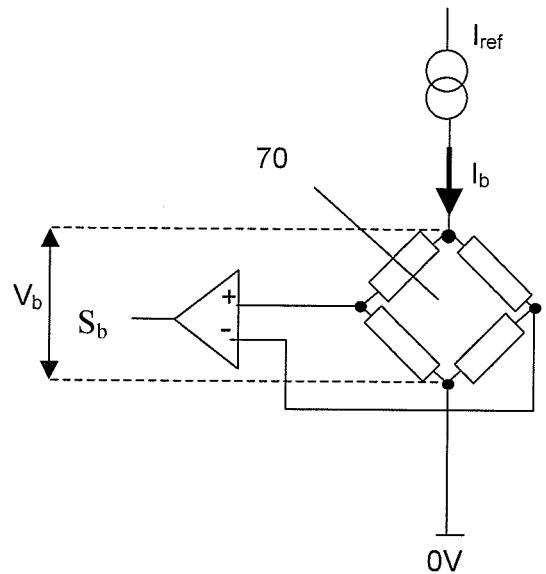
Fig.7: Constant Current Circuit
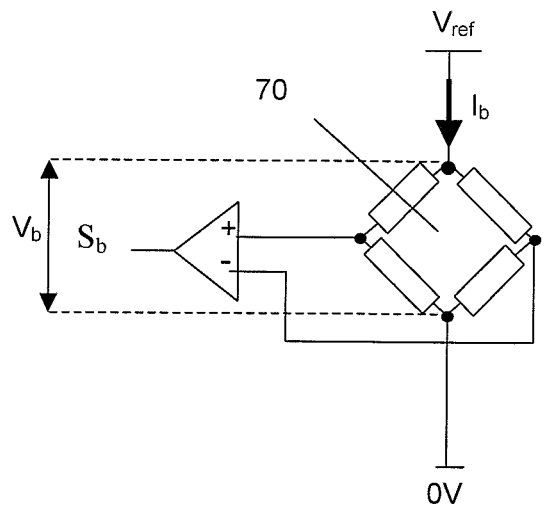
Fig. 8: Constant Voltage

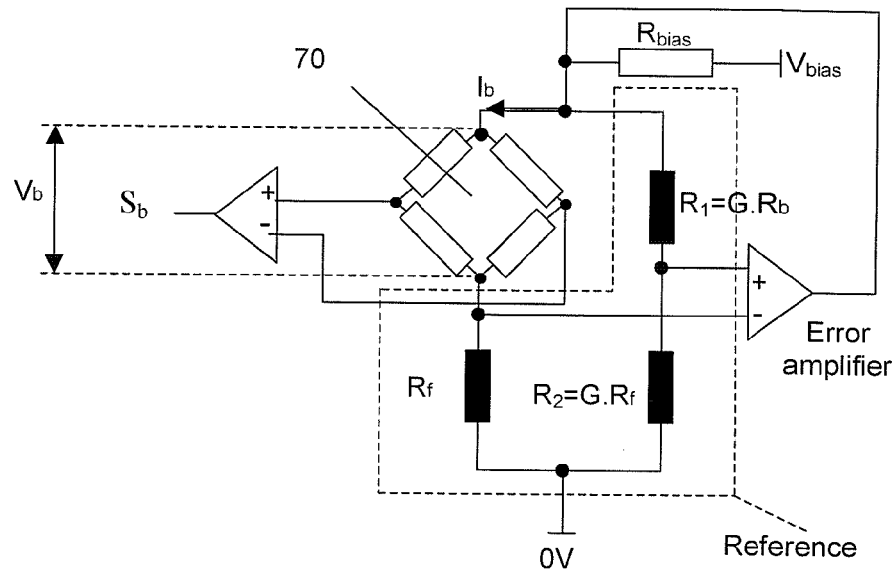
Figure 9: Constant resistance circuit
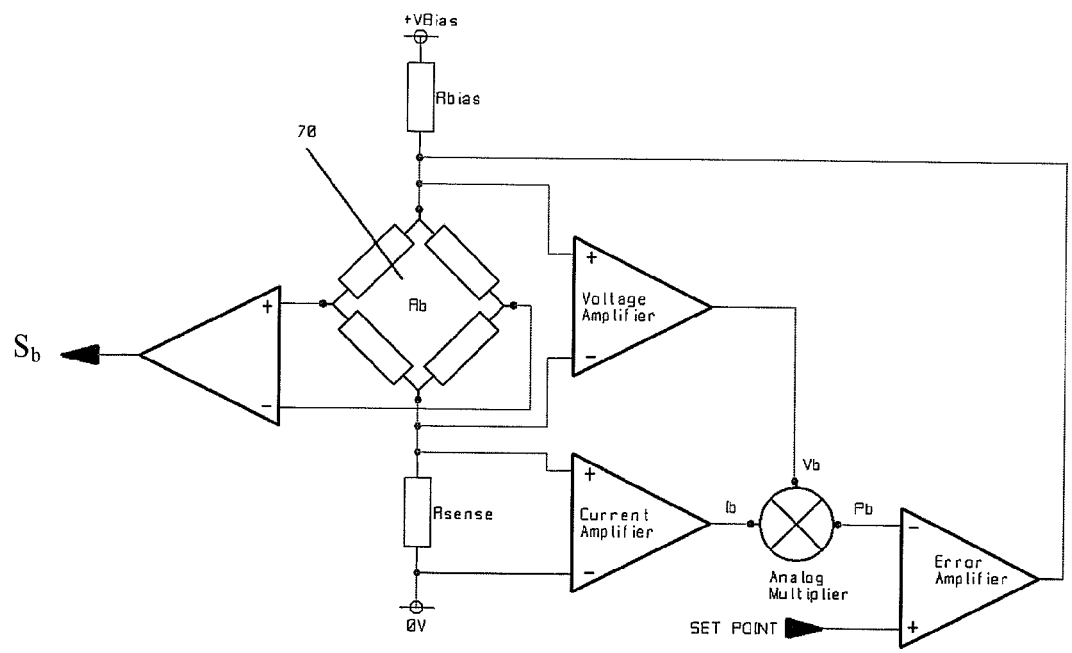
Fig.10: Constant Power Circuit

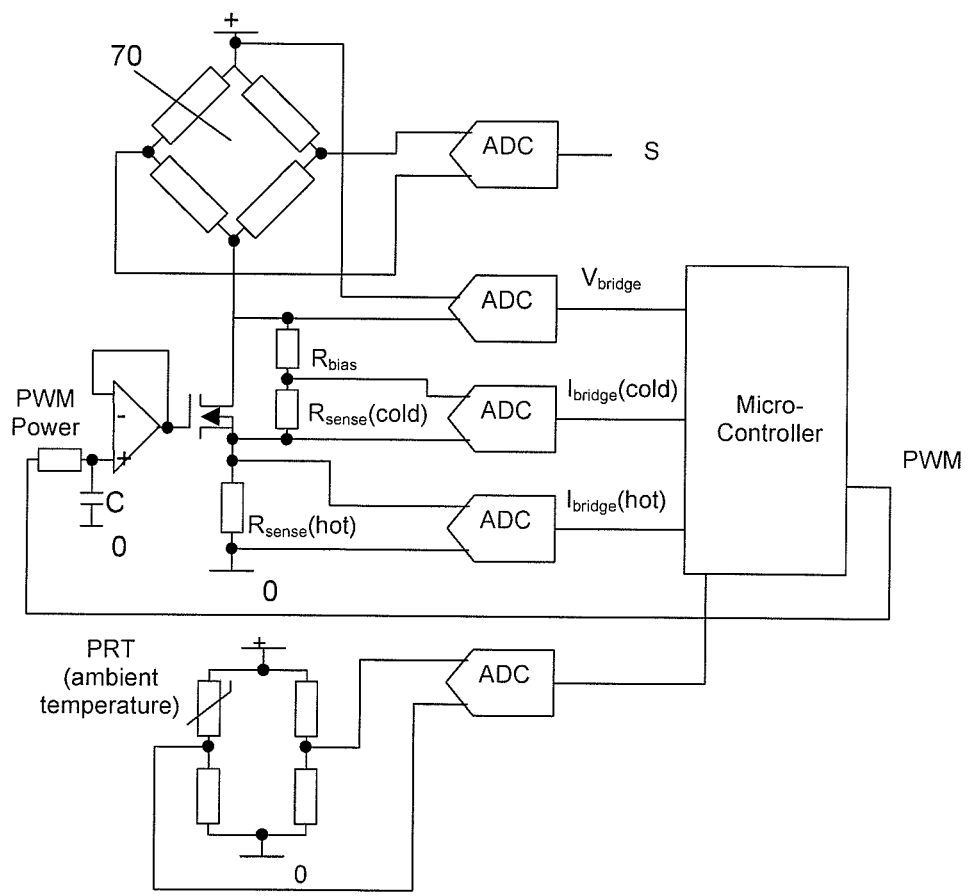
Fig. 11: Digital Circuit

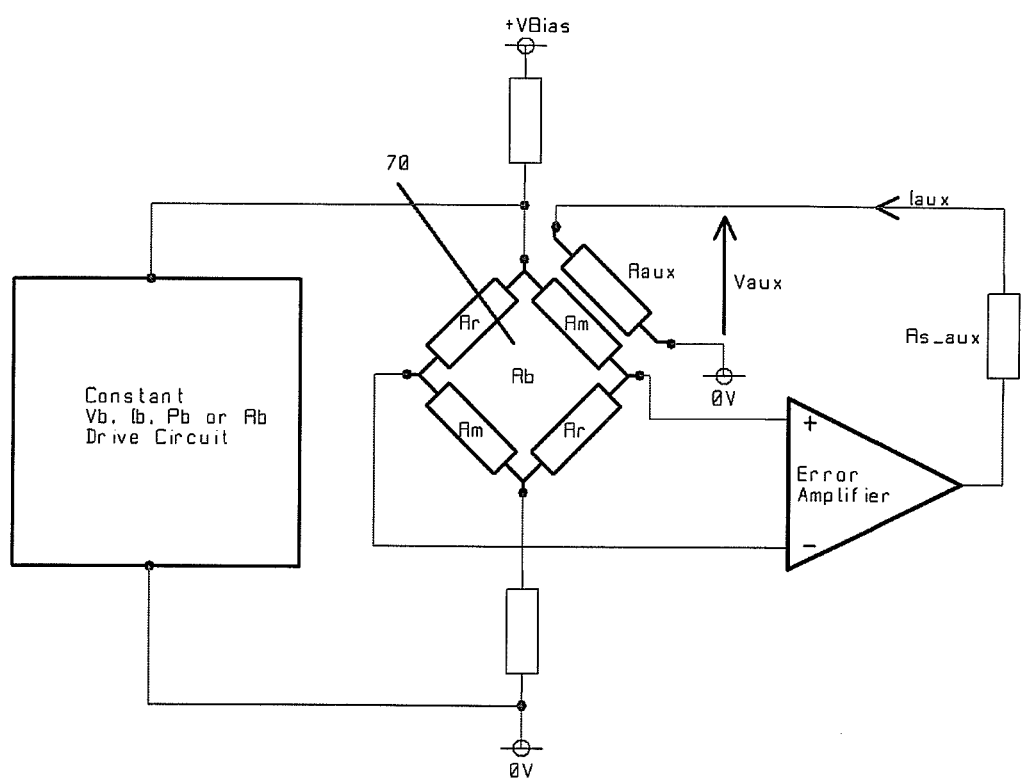
Fig.12: Feedback Circuit

APPARATUS FOR MEASURING THE FLOW RATE OF A FLUID

CROSS REFERENCE TO RELATED APPLICATIONS

This application claims priority under 35 U.S.C. §119 to Great Britain patent application No. GB1009444.9 filed on Jun. 4 2010, which is incorporated herein by reference.

FIELD OF INVENTION

The present invention provides apparatus for measuring the flow rate of a fluid, by measuring differential effects of a fluid flow on a measure element and a reference element.

BACKGROUND OF THE INVENTION

Steady state thermal fluid flow meters are primarily mass flow based devices, where the rate of heat transfer (dQ/dt) being measured will depend upon the rate of mass flow of the fluid with time (dM/dt) as well as the specific heat capacity at constant pressure ($C_p$), so that:

$$\frac{dQ}{dt} \propto C_p \frac{dM}{dt}.$$

The volume flow rate (dV/dt) and mass flow rate of the fluid can be related via the density (ρ) such that:

$$\frac{dV}{dt} = \frac{1}{\rho}\frac{dM}{dt}.$$

Many thermal mass flow meters are based on the heat tracer principle. An illustration of a simple version is shown in FIG. 1. In this example, the upstream element (1) and downstream element (2) are temperature sensitive resistors wound around a thin walled pipe (3), which make up one arm of a Wheatstone bridge (4), the other arm being made up of two reference resistors (5). When a voltage is applied across the bridge, the upstream and downstream resistance elements heat up by Joule heating. When no flow is present, the upstream and downstream element thermal losses are matched and a zero volts bridge offset voltage (6) is seen. When fluid flow is present, the downstream resistor thermal losses are less than for the upstream resistor, due to the transfer of heat to fluid by the upstream sensor. The bridge offset voltage will give a voltage signal which will be related to the mass flow rate. This concept can also be used with resistor elements immersed within the sample fluid and also in thin or thick film format. Examples of this type of flow sensor can be seen in patents US2006/0101907, U.S. Pat. Nos. 5,461,913, 4,984,460 and 4,548,075.

A more complex variation on this theme is illustrated in FIG. 2. In this example, a heater coil (10) is centrally wrapped around a thin walled pipe (11), through which the fluid to be measured flows. Two temperature sensors (12) and (13) are mounted equidistantly from the central heater element. Under conditions of no flow, heat transfer to the two temperature sensors will be identical and no temperature difference will be seen. Under conditions of flow, the heat transfer to the downstream temperature sensor (13) will be greater than for the upstream sensor (12), since the fluid will be heated up as it passes by the heater section on its way downstream. The temperature difference between the downstream ($T_d$) and upstream ($T_u$) sensors can be calibrated for the flow rate, i.e.

$$\frac{dQ}{dt} \propto \rho C_p \frac{dV}{dt}(T_d - T_u)$$

This temperature difference will typically be measured by using a Wheatstone bridge circuit (14) where temperature dependent resistors are used to measure $T_d$ and $T_u$ in one arm of the bridge, external reference resistors (15) are used in the other arm of the bridge and the output voltage measured across the bridge (16) is related to fluid flow rate. This design and the previous format are often used in conjunction with solenoid valves for mass flow controllers.

However, as for the previously described method, it is not an energy efficient means for measuring the flow rate and is mainly used for gases at low flow rates, often in a bypass arrangement. An alternative mechanical arrangement of this design with higher sensitivity is to mount the heating and sensing elements in the sample stream within the pipe, however, it is much more difficult to accurately and repeatably position the elements within the pipe bore and the elements' performance may be significantly affected by high sample stream velocity, particulates or entrained fluids condensing out. This can also be used in thin or thick film format. Examples of using such a method are shown in patents U.S. Pat. Nos. 4,651,564 and 7,255,001. Such an example can also be used to measure the velocity of a fluid flow by pulsing the central heater element and measuring the time of flight or phase shift for the heat pulse to reach the downstream element, with the upstream element acting as a reference to cancel common mode heating effects when required. The velocity can be found from the distance between the heater and sensing element divided by time of flight. An example of such a device can be seen in patent U.S. Pat. No. 6,169,965 and a general device for measuring time of flight in fluids via a thermal pulse is shown in U.S. Pat. No. 5,347,876.

The flow velocity, which can be related to fluid flow rate, can also be measured via the cooling by the flow of a fluid over a hot element or filament wire, such as a hot wire anemometer, an illustration of which is shown in FIG. 3. In this case, the hot measurement element (20) positioned within a pipe (21) is cooled convectively by the fluid passing over it and the decrease in element temperature or increase in power required to maintain the same working temperature constitutes the signal. A Wheatstone bridge (22) may be used to output the signal, where the hot element consists of a temperature dependent resistor, with reference resistors (23) making up the other bridge resistances. The offset voltage across the bridge (24) is related to the fluid flow rate. Often this type of device is used in conjunction with a reference temperature sensor immersed in the sample fluid in order to maintain a fixed uplift temperature of the active measurement resistive element relative to the ambient fluid temperature. Examples are shown in patents US2008/0271545, US2005/0150310 and U.S. Pat. No. 5,780,737.

Thin filament wires or thin film devices will give fast time responses and large signals when compared to thicker wires, but they are fragile and will be subject to error if there are particulates or entrained fluids within a gaseous mixture which could deposit on the wire. They also have limited flow ranges unless used in bypass mode.

SUMMARY OF INVENTION

A first aspect of the present invention provides a device for measuring the flow rate of a fluid, the device comprising:
- a measure cell having at least one fluid flow inlet and at least one fluid flow outlet and providing a fluid flow path between the inlet and outlet;
- a heated measure element arranged in the measure cell so as to be exposed to heat transfer effects of fluid flowing through the fluid flow path;
- a heated reference element arranged in the measure cell so as to have reduced exposure to fluid flowing through the fluid flow path compared to the measure element, wherein the measure and reference elements are symmetrically or equivalently arranged within the measure cell such that they experience an equivalent heat transfer environment, other than the heat transfer effects due to fluid flowing through the fluid flow path;
- at least one measurement component connected to at least one of the measure element and the reference element, for measuring at least one parameter that is indicative of the heat transfer effects of fluid flowing through the fluid flow path; and
- means for deriving a signal indicative of the fluid flow rate from the at least one measured parameter.

In one embodiment, a symmetrical arrangement of the measure and reference elements involves equivalent geometry including equal distances from the sidewalls of the measure cell. In one embodiment, the measure and reference elements have equal dimensions, electrical conduction and thermal conduction. In one embodiment, a heat exchanger is arranged between the measure and reference elements to enable exchange of heat between the measure and reference elements. In one embodiment, the measure and reference elements have a planar geometry. This enables a compact design and a relatively large surface area for efficient thermal interchange between the measure and reference elements.

An embodiment of the invention provides a compact sensor for measuring the flow rate of a fluid, using a heated measure element and a heated reference element which are in substantially the same thermal environment except that the measure element is situated in the path of the cooling fluid flow and the reference element is substantially sheltered from this fluid flow. In one embodiment, the measure and reference elements are held within a measure cell and connected electrically within a Wheatstone bridge or voltage divider format, and in other embodiments their temperatures are measured directly using thermocouples or other temperature-sensing devices. In one embodiment, the incoming fluid is in thermal equilibrium with the measure cell, a condition which may require pre-heating or cooling of the incoming fluid by a heat exchanger or other suitable means. In one embodiment, an electrical circuit is used to drive the bridge or voltage divider, whereby measured parameters from the bridge or voltage divider can be calibrated to indicate the fluid flow rate.

In one embodiment, the measure and reference elements are essentially identical with matching thermal characteristics, so that the shape, size, thermal and electrical conduction, radiation emissive characteristics and thermal mass of the elements are indistinguishable. The measure and reference elements are planar and may be of thick film, thin film, resistor wire or similar construction. The use of planar measure and reference elements enables compact design and high surface area for efficient thermal interchange between measure and reference elements and also between the measure element and the incoming fluid and facilitates mass production in a repeatable way. Thermal exchange between the reference and measure elements is used to optimise noise rejection due to common mode background thermal effects. The cell design, materials and dimensions as well as the flow inlet and outlet means may be optimised for the required application (such as for particular gas compositions) to give the required sensitivity and flow range.

An additional heating resistor may be present on the measure element, extra heat being applied to the measure element by said heating resistor in order to maintain the bridge offset voltage at a fixed value under conditions of fluid flow, said extra heat being related to the fluid flow rate.

In another aspect of the invention, there is provided a device for measuring the flow rate of a fluid, the device comprising:
- a measure cell having at least one fluid flow inlet and at least one fluid flow outlet and providing a fluid flow path between the inlet and outlet;
- a cooled measure element arranged in the measure cell so as to be exposed to heat transfer effects of fluid flowing through the fluid flow path;
- a cooled reference element arranged in the measure cell so as to have reduced exposure to fluid flowing through the fluid flow path compared to the measure element, wherein the measure and reference elements are symmetrically or equivalently arranged within the measure cell such that they experience an equivalent heat transfer environment, other than the effects due to fluid flowing through the fluid flow path;
- at least one measurement component connected to at least one of the measure element and the reference element, for measuring at least one parameter that is indicative of the heat transfer effects of fluid flowing through the fluid flow path; and
- means for deriving a signal indicative of the fluid flow rate from the at least one measured parameter.

BRIEF DESCRIPTION OF THE DRAWINGS

Embodiments of the invention are described below in more detail, by way of example, with reference to the accompanying drawings in which:

FIGS. 1-3 are schematic representations of prior art solutions for the measurement of fluid flow using thermal mass transfer, and are described in the background section of this specification.

FIG. 4 is an illustration of an embodiment of the invention, where the measure and reference elements are thick film resistors printed on ceramic discs, which are mounted within a cylindrical measurement cell.

FIGS. 7-10 are schematic representations of analogue circuits which could be used to drive the bridge in constant current, voltage, resistance or power modes.

FIG. 11 shows a digital circuit which has the capability to drive the bridge in any of the modes shown in FIGS. 7-10.

FIG. 12 shows an example of an analogue feedback circuit used to maintain the bridge offset voltage at a fixed offset.

DETAILED DESCRIPTION OF EXEMPLARY EMBODIMENTS

Figure 5:
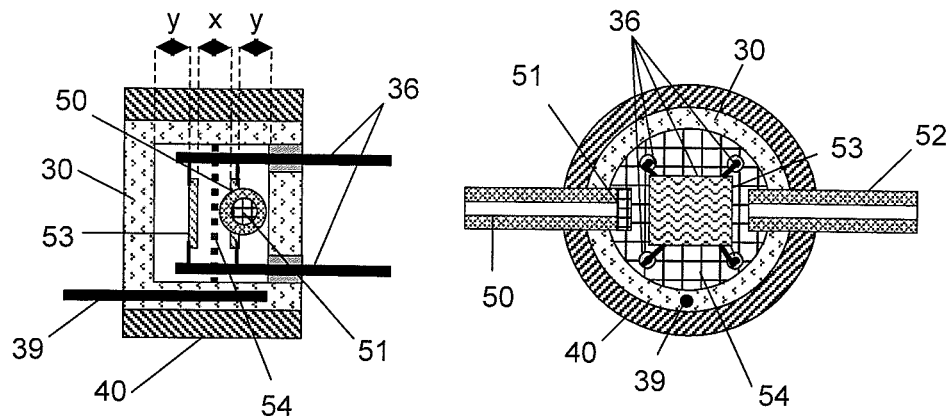
FIG. 5 is a variant of the embodiment of FIG. 4 and includes optional features including a diffusive element between the measure and reference element, to increase the thermal sheltering of the reference element from direct flow effects, and a flow modifying element on the inlet tube. It also illustrates that the measure and reference elements may have different formats by showing them in this instance as rectangular thick film substrates rather than discs.

An illustration of a first embodiment is shown in FIGS. 4a and 4b, although alternative designs containing the same essential features could be constructed. A measurement cell (30) contains a measure element (31) and reference element (32), both of which are thick film printed resistors on ceramic discs. The measure and reference elements have at least one resistor printed on the substrate. The item in FIG. 4 that is expanded in a separate 'balloon' shows a ceramic disc (33), on which two platinum resistor tracks are printed (34). Thin platinum or platinum/iridium wires (35) are used to connect these resistors to the electrodes (36) via welding. Precise positioning of the elements is important to this embodiment and this is achieved by using precision mounting apparatus or other suitable means. In some embodiments, the elements have a protective glaze layer. The measure and reference discs are aligned with the resistor tracks perpendicular to each other, so that the measure and reference resistors are electrically connected to form a Wheatstone bridge. A complete bridge, where the measure and reference elements have two resistors on each substrate, has advantages over a half bridge because the signal is doubled and because it is possible to exactly match any temperature coefficient or inherent drift characteristics of the element resistors. Nevertheless, the invention emcompasses an embodiment in which only one resistor is printed on each measure element and reference element disc, and then they are connected as half a Wheatstone bridge, using external reference resistors to balance the bridge output or in a voltage divider format where the midpoint voltage can be recorded directly in software via an ADC (analogue to digital converter) and a software offset value can be implemented. The bridge or voltage divider may be run in constant voltage, current, power or resistance mode, using an AC or DC drive, and the derived signal which is used to indicate the fluid flow rate may be the bridge offset (or voltage divider midpoint) voltage, bridge or voltage divider current, voltage, resistance, power or combinations thereof The design of the measure cell of this embodiment is chosen such that it is essentially symmetrical or otherwise provides an equivalent environment from the viewpoint of the measure and reference elements, which are substantially identical and are held in place by electrodes. The difference between the two parts of the measure cell containing the measure and reference elements is the fluid flow inlet (37) and outlet (38). In the embodiment of FIGS. 4a and 4b, there is a single inlet and a single outlet, but other embodiments have more than one such inlet and outlet. The electrodes are sufficiently rigid to hold the discs exactly in place, sufficiently electrically conductive not to contribute to the bridge resistance or cause a voltage drop on the output signal, and sufficiently thermally conductive that the thermal losses seen by the measure and reference discs via the connecting wires are essentially identical. The incoming fluid is at ambient (measure cell) temperature and this is achieved by using a heat exchanger to pre-heat or cool the fluid, or other suitable means, where necessary.

In the present embodiment, the measure element shields the reference element from direct flow and additionally this allows extremely compact construction and high efficiency of thermal exchange between the cooler incoming fluid and the hotter measure element. The fluid in the volume surrounding the reference element is primarily exchanged via diffusion with the fluid in the volume surrounding the measure element. This fluid exchange ensures good common mode thermal losses via the fluid. However, in some embodiments, a fraction of fluid flow can be directed to pass by the reference element and the fluid volume proximate the reference element. This can increase the rate of exchange of fluid surrounding the reference element and/or extend the measurement range, if required, by reducing the fraction of the flow directed to the measure element. In either case, the majority of the fluid flow still passes over the measure element. Returning to the above embodiment, the discs' centres lie on the same axis and they are parallel to each other. In the following notation, the distance between the measure element and the measure cell wall and between the reference element and the measure cell wall is y, and the distance between the measure element and reference element is x. For a given fluid composition, y can be chosen to optimise parameters for heat loss due to thermal conductivity and natural convection to the measure cell walls. The distance y and the shape and size of the fluid inlet and outlet will also determine the efficiency with which the fluid takes away heat from the measure element. The distance x can be chosen so as to optimize the heat exchange between the measure and reference elements. The thickness of the discs is small compared to the diameter of the discs. This means that thermal losses from the discs through the fluid will be dominated by the upper and lower surfaces of the discs rather than from the sides.

When a current or voltage is applied to the bridge or voltage divider, the resistors will heat via Joule heating, making the measure and reference elements hotter with respect to the ambient. The temperature reached by the elements will depend on the electrical power supplied and thermal losses to the measure cell via the electrical connections and those through the gas via conduction, convection and radiation. Due to the symmetrical nature of the design, with no fluid flow present, the thermal losses of the measure and reference elements are approximately matched and therefore they are at the same temperature and no bridge offset voltage is seen. However, when fluid flow is present, the measure element temperature will be reduced by losing heat to the flow, whilst the reference element that is away from the flow will remain at a higher temperature than the measure element. An offset voltage will be seen, which will be related to the temperature difference between measure and reference elements and hence the flow rate. The distance of the flow inlet and flow outlet from the measure element and the diameters of the internal bores or any flow modifying elements present in the flow inlet and/or outlet will change the fluid flow profile incident on the measure element, including whether the flow is laminar or turbulent. These device parameters will therefore be related to the sensitivity and performance of the device with flow. The relationship of offset (or voltage divider midpoint) voltage, bridge or voltage divider current, voltage, resistance and power with flow will be dependent on cell design, the design of the fluid inlet and outlet and fluid properties such as thermal conductivity and heat capacity, as well as the temperature difference between the fluid temperature and measure element.

Under conditions of flow, thermal losses for the measure and reference elements are no longer matched. Let us consider some situations which arise as x is varied, whilst maintaining y constant. If x were extremely large, there would be virtually no thermal energy exchange between the measure and reference elements and this system would behave in a similar way as if the elements were mounted in the same plane, side by side with no thermal connection and the measure element would quickly be cooled by inflowing fluid. However, if x were very small there would be a large net heat transfer from the hotter reference element to the cooler measure element via thermal conductivity through the fluid, natural convection and radiation. The result of this heat transfer would be that the cooling of the measure element relative to the reference element does not vary so much with flow as would be the case for a large x. Since a larger temperature difference with respect to the ambient is maintained for a small x, the useable flow measurement range is extended (but sensitivity is reduced). The optimum value of x to choose will depend on the flow geometry of the cell, fluid composition, desired flow range and the way in which the Wheatstone bridge or voltage divider is driven.

The exchange heat transfer through the fluid will depend not only on x, but also on the area of the planar measure element which is parallel to and aligned with the reference element, and also on the thermal conductivity properties of the sample fluid. The high surface area, small separation distance, planar arrangement that is described here facilitates the heat exchange between measure and reference elements and is much more efficient than, for example, a conventional wire, bead or coil structure would be. The ultimate close limit for x will be when the measure and reference elements are either side of the same substrate with the temperature gradient and heat exchange between the elements being determined by the thermal conductivity properties of the substrate material and its thickness.

If extra heating is required to be added to the measure element for use with the feedback circuit to maintain the bridge offset (or voltage divider midpoint) voltage at a fixed, null value, then an additional resistor may be thick film printed (or other suitable means employed) to add extra heat to the measure element disc. This additional resistor may be inter-digitated with the other resistors on the same substrate layer or printed on a separate, electrically insulated layer from the first bridge resistors, as long as there is sufficient thermal conduction for thermal equilibrium to occur between all of the resistors present on the element. The extra heat supplied will be related to the fluid flow rate and in this format there is optimum common mode noise rejection, since the measure and reference elements are maintained at essentially identical temperatures under conditions of flow, thus preserving thermal symmetry, excepting the mass flow effect. The thermal exchange between measure and reference elements will also decrease any residual temperature difference due to small imperfections in the thermal matching of the elements.

Since the measure and reference elements exchange heat, the total energy supplied to the system will be less than, for example, measure and reference elements which are thermally isolated from each other and lose heat from both upper and lower surfaces. This reduction in applied power is particularly advantageous for battery powered portable units or intrinsically safe instrumentation where the power available is limited to avoid creating ignition sources within explosive atmospheres.

A temperature sensor (39) may be located within the wall of the measure cell to monitor ambient temperature and this may be used to correct for temperature coefficient effects on the signal. This may be achieved by using a mathematical algorithm, such as a linear regression fit or a polynomial involving the measured temperature term. Alternatively, the electrical resistance of the bridge can be adjusted to maintain the same temperature uplift of the measure and reference resistors relative to the ambient.

The cell body may also contain an ambient temperature sensor and a heater (40) so that a constant temperature of the measurement cell may be maintained, where the ambient temperature is not stable.

The flow inlet (50) could be at any inlet angle, shape or distance relative to the measure element (as indicated by the alternative embodiment shown in FIGS. 5a and 5b), to modify its performance relative to flow. Some embodiments of the invention include one or more flow modifying elements (51) on the flow inlet, flow outlet (52) or within the measurement cell, designed to modify flow sensitivity and performance. The element substrates (53) may also be of various shapes, as long as they are substantially identical, and are shown in FIG. 5b as rectangular rather than disc format. A diffusive flow isolating element (54) may also be included to enhance the shielding of the reference element from the direct inlet flow, whilst allowing diffusion to take place.

Figure 6:
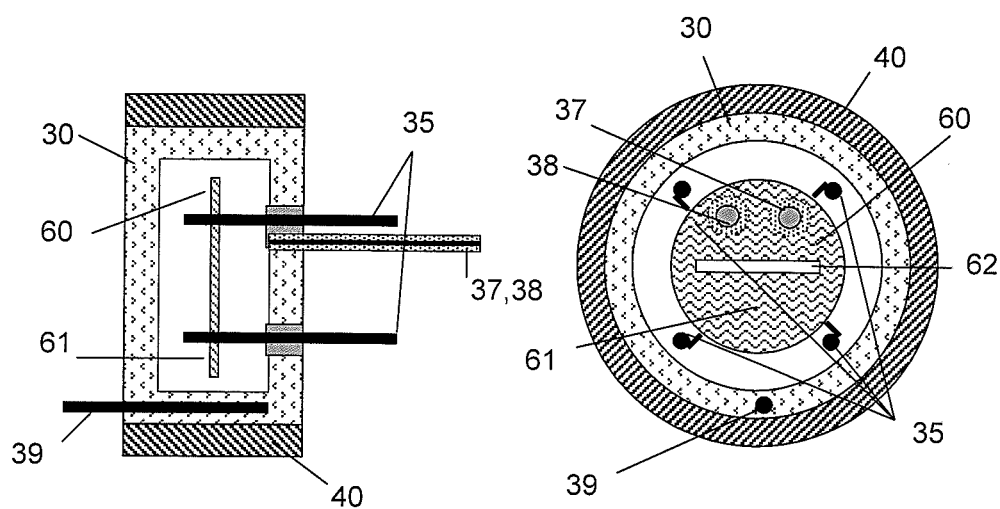
FIG. 6 illustrates another variant, where the measure and reference elements are contained on the same thick film substrate, but in this instance, the thermal exchange between them is dominated by the thermal properties of the connective substrate between them.

However, despite the above stated advantages of the parallel, concentric arrangement, the measure and reference elements could also be two elements situated in the same plane, or different plane under equivalent thermal conditions, with a means to preferentially allow the fluid flow over the measure element, whilst protecting the reference from the flow. In some preferred embodiments, there is a thermal exchange mechanism between them. Both measure (60) and reference (61) elements could also be contained on the same substrate (FIGS. 6a and 6b), with heat exchange between measure and reference elements being modified by providing thermal breaks (62) and by appropriate selection or modification of the substrate material and physical parameters. This has the advantages of simplified manufacturing processing and positioning of the elements and thermal loss matching. There could also be a plurality of measure and reference elements and/or resistors, each of which contributes to the total signal.

The relative merits of the different methods to drive the bridge or voltage divider will be discussed in the following sections. It will be illustrated for a full bridge, but similar behaviour would be seen for a half bridge format with external resistors making up the other arm of the bridge.

This device could easily be adapted for thin film or other formats and the element shape could be a disc, rectangular or other arbitrary design as long as both the measure and reference elements have effectively identical formats. The temperature difference between measure and reference elements could also be determined independently using temperature sensing devices mounted on said elements such as thermocouples, thermistors, resistance thermometers or other suitable means. It could also be designed to have cooled measure and reference elements, by Peltier cooler or other means, and the warmer sample fluid then heats the measure element relative to the reference element.

The flow rate would then be related to the temperature difference, power applied or other system parameters in a similar way to the standard heated system.

In addition, instead of using the Wheatstone bridge or voltage divider format, the measure and reference elements could both be driven at substantially constant and substantially identical power, current or voltage by a suitable circuit or independent circuits, and the temperature difference between measure and reference elements could then be determined either by the resistance of the measure and reference elements if appropriate or independently using temperature sensing devices mounted on said elements such as thermocouples, thermistors, resistance thermometers or other suitable means, said temperature difference being related to the fluid flow rate. An additional, independent, heating resistor or other suitable means of providing heat may be present on the measure element, whereby the additional power provided to maintain both measure and reference elements at substantially identical temperatures would be related to the fluid flow rate.

The measure and reference elements may also be maintained at substantially identical, elevated temperatures with respect to the ambient by suitable independent circuits, using constant resistance drives for element resistors or other suitable means of applying heat and with temperature sensing devices mounted on said elements such as thermocouples, thermistors, resistance thermometers or other suitable means if required. The signal is derived from either the power difference between the summation of the measure and reference powers, with and without flow, or the power difference between the measure and reference elements to maintain said elements at the required temperature, said power difference being related to the fluid flow rate.

Description of Drive Circuits

The circuit schematics of FIGS. 7-10, which are described below, give examples of drive circuits which could be used to drive the flow sensor in the above described drive modes.

FIGS. 7 and 8 show simple schematics of the circuits used to drive the flow sensor (70) in constant current and constant voltage modes respectively, where $I_{ref}$ is a constant current source, $V_{ref}$ is a constant voltage source, $I_b$ is the bridge current, $V_b$ is the bridge voltage and S is the bridge offset voltage.

In the constant resistance circuit of FIG. 9, the circuit controls the overall resistance of the flow sensor (70) to a fixed value. The sensor, which has resistance $R_b$, is connected in a Wheatstone bridge arrangement with resistors $R_f$, $R_1$ and $R_2$. $R_f$ is a small series resistance forming the left arm of the Wheatstone bridge in conjunction with the sensor. The right arm of the bridge is formed from $R_1$ and $R_2$, whose values are scaled from $R_b$ and $R_f$ by a gain factor, G. $R_f$ should be small compared to $R_b$ in order avoid wasting electrical power via heat dissipation in $R_f$. Conversely, $R_1$ and $R_2$ must be large to avoid dissipating more power than necessary in self heating, by diverting most of the current down the left hand arm of the Wheatstone bridge. The bridge is biased by a small current provided by $V_{bias}$ via $R_{bias}$ in order for the control circuit to start up. The imbalance in the bridge is fed to the error amplifier which drives the bridge with sufficient current to make the ratio of $R_b$:$R_f$ the same as the ratio $R_1$:$R_2$.

In the constant power circuit (FIG. 10), the circuit drives the sensor with a constant power. The flow sensor (70) of resistance $R_b$ is connected in series with a small sense resistor $R_{sense}$. The circuit measures the sensor voltage ($V_b$) and current ($I_b$). These signals are multiplied together to give a measurement of sensor power. The error amplifier controls the sensor power to be the same as the set-point value. The sensor is biased by a small current provided by $V_{bias}$ via $R_{bias}$ in order for the control circuit to start up.

The digital circuit (FIG. 11) may be used to drive the flow sensor (70) in constant voltage, current, power or resistance modes. The circuit measures the bridge voltage $V_b$ and current $I_b$ and the ambient temperature, $T_a$. The microcontroller may be programmed to control the bridge voltage, current, power or resistance. Temperature compensation may be applied. A PID control algorithm is used to optimise the response of the sensor to changes in gas flow. The microcontroller controls the drive to the bridge by a PWM output which is filtered to provide a DC voltage drive to a FET used as a variable resistor. $R_{bias}$ provides a small current through the sensor when the drive FET is turned off $R_{bias}$ is set to give a sufficiently small current through the sensor so that the sensor does not dissipate enough power to cause any appreciable self-heating. In this way, the "cold" resistance of the sensor can be measured by the circuit. The "cold" resistance measurement is used to automatically calibrate the control circuit to take account of manufacturing variability in the sensor resistance. The ambient temperature is measured using a platinum resistance thermometer (PRT) in a Wheatstone bridge arrangement. Other temperature-sensing methods could be used, but the PRT matches the temperature coefficient of the platinum elements in the flow sensor, giving the most accurate temperature compensation. The bridge parameters can be output digitally. For example, the bridge offset voltage, $S_b$, is derived from the imbalance of the flow sensor. It may be made available directly from the ADC or fed into the microcontroller for further processing. The sensor parameters ($V_b$, $I_b$, $P_b$, $R_b$) measured or calculated by the microcontroller may be used in conjunction with the sensor signal, $S_b$, to provide the flow indication.

The additional power feedback circuit (FIG. 12) works in conjunction with any of the previously described control circuits. An auxiliary resistor, $R_{aux}$ is printed on the measurement disc. An error amplifier measures the bridge offset voltage, $S_b$, and applies power to $R_{aux}$ in order to restore the balance of the bridge. The power applied to $R_{aux}$ is a measure of fluid flow.

If the electronic circuit provides a constant voltage across the bridge or voltage divider, as the measure element cools, so the reference element will begin to provide heat to the measure element. This extends the measurement flow range compared to two thermally isolated elements, by slowing down the cooling rate of the measure element, although the reference element temperature will be reduced by the heat loss to the measure element. The rate at which the reference element loses temperature is slowed down by the fact that as the measure element cools, more voltage is disposed across the reference element than the measure element and the electrical power dissipated as heat is given by the square of the voltage divided by the resistance.

In constant current mode, the system will behave in similar way to constant voltage mode in that as the measure element cools, so the reference element will begin to provide heat to the measure element. This also extends the measurement flow range compared to two thermally isolated elements, although the reference element temperature will be reduced by the heat loss to the measure element. However, in this case, as the reference element temperature is cooled by donating energy to the measure element, the electrical power dissipated by the reference element will be reduced. This dissipated power is given by the square of the current, which is constant, multiplied by the resistance of the element, which is reducing.

Constant bridge power has an intermediate effect between constant voltage and constant current drive and, again, as the measure element is cooled, the extra heat provided by the reference element slows down the cooling of the measure element, so extending the measurement range.

However, if the bridge or voltage divider is run in constant resistance mode, then as the measure element reduces in temperature with fluid flow, the reference element not only begins to donate heat to the measure element, but also to become hotter itself. This has the dual effects of increasing the temperature difference between measure and reference elements, which gives a larger offset (or voltage divider midpoint) voltage and power, and also slows down the cooling of the measure element due to enhanced heat transfer from the reference element and hence extends the flow measurement range. The power will increase substantially with flow to maintain the constant resistance.

If the additional heating feedback circuit is used to maintain the bridge null voltage or voltage divider midpoint value, it will give a signal related to the extra heat supplied to the measure disc and this will be related to the fluid flow rate. The net effect will be to maintain the measure and reference elements with essentially no temperature difference. In constant resistance mode, both the measure and reference resistors will be maintained at the same temperature uplift as with no flow. In the other drive modes, it is possible the temperature of the elements could reduce approximately equally in the case of imperfect symmetry or flow leakage to the reference element.

However, of all of the above electrical drive circuits, if the fluid composition changes, only the constant resistance circuit will always maintain the same starting temperature of measure and reference elements with zero flow for a fixed ambient temperature. This is because the thermal loss mechanisms will be affected by the thermal conductivity, specific heat capacity and density of the fluid to be measured. A change in the temperature uplift of the measure and reference elements relative to the ambient will affect sensitivity and range.

Theoretical Description and Predicted Behaviour with Flow

The following mathematical treatment is designed to illustrate the basic theory behind this design concept. It makes simplified assumptions for a physically symmetric or equivalent system from the viewpoint of the measure and reference elements, other than the fluid flow path, in order to predict the general behaviour of a sensor in a preferred embodiment, such as illustrated in FIG. 4. It assumes that there is no appreciable direct fluid flow from the measure element fluid volume to the reference element fluid volume. If any such direct fluid flow does occur to a significant degree, fractional flow terms may be included to modify the described behaviour, but similar qualitative behaviour would be seen. An actual sensor using such a design would be calibrated with known flow rates to ensure conformity of output with flow rate, and its performance and flow range would be contingent on the mechanical design and fluid properties. In practice, a pragmatic rather than theoretical mathematical fit may also be applied to the outputs to get the best fit to experimental results. The following illustration is for a full Wheatstone bridge, but similar results could be derived using a half Wheatstone or voltage divider format.

The bridge resistance $R_b$ will be given by:

$$R_b = \frac{R_m + R_r}{2} \quad (1)$$

where $R_m$ and $R_r$ are the measure and reference resistances respectively, given by:

$$R_m = R_a(1+\alpha T_m) \quad (2)$$

and $$R_r = R_a(1+\alpha T_r) \quad (3)$$

where $R_a$ is the bridge resistance at ambient temperature, $\alpha$ is the temperature coefficient of resistance of the resistors and $T_m$ and $T_r$ are the temperatures above ambient temperature of the measure and reference elements with flow respectively.

The temperatures above ambient of the measure and reference elements will be given by:

$$T_m = T_{av} + \Delta T + \Delta T_o \quad (4)$$

$$T_r = T_{av} - \Delta T - \Delta T_o \quad (5)$$

where $T_{av}$ is the average temperature of the measure and reference elements above ambient temperature ($T_{av}=0.5(T_m+T_r)$), $\Delta T$ is a temperature change term which is a function of the flow rate and $\Delta T_o$ is a constant equal to half the temperature imbalance at zero flow due to imperfect element matching, ideally $\Delta T_o=0$ for a perfect system. From equations 1-5:

$$R_b = R_a(1+\alpha T_{av}) \quad (6)$$

and via rearrangement, the average temperature uplift can be found by measuring $R_b$:

$$T_{av} = \frac{1}{\alpha}\left(\frac{R_b}{R_a} - 1\right) \quad (7)$$

The main power losses for the measure element $P_m$ under steady state ambient temperature and flow conditions for a thermally symmetrical environment will be given by:

$$P_m = T_m(K_c+K_e+K_r+K_n)+K_x(T_m-T_r)+K_{cal}FT_m-P_a \quad (8)$$

where $K_c$ is the constant associated with conductive losses to the measure cell walls through the fluid, $K_e$ is the constant associated with conductive losses via the wires to the connecting electrodes, $K_r$ is the constant associated with radiative losses, $K_n$ is the constant associated with Newtonian natural convective cooling, $K_x$ is the exchange constant associated with heat exchange between the measure and reference elements and F is the flow coefficient, which is flow dependent. The calibration flow efficiency constant, $K_{cal}$, is present in front of the flow coefficient to allow for the efficiency of the thermal cooling effect produced by the flow of fluid over the measure element. Intuitively, one would expect this to be approximately ½, since the average fluid temperature uplift confined between the measure element and the measure cell wall will be approximately ½$T_m$. In practice, the dimensions of the measure cell and measure element to reference element separation are sufficiently small that thermal conductivity through the fluid normally dominates over radiation and natural convection losses. $P_a$ is the additional power supplied to the measure element via an extra heater resistor, when present, or other means to maintain a defined bridge offset voltage. $P_a$ will also be flow dependent.

Assuming that thermal mass flow is the predominant cooling mechanism and that there is sufficient time for efficient thermal interchange to produce thermal equilibrium, the flow coefficient will be given by:

$$F = \rho C_p \left( \frac{dV}{dt} - c_o \right) \quad (9)$$

where $\rho$ is the fluid density, $C_p$ is the fluid specific heat capacity at constant pressure and $dV/dt$ is the volume fluid flow rate. The constant, $c_o$, is to account for any minimum flow level needed for the stable flow regime to become established, which in turn will depend on the internal geometry of the measurement cell and fluid properties. Ideally, $c_o$ would be equal to zero for all fluids, however, if required, its value can be optimised via calibration. Any measurement uncertainty caused by ignoring this constant offset will become relatively reduced at higher flow rates.

The thermal loss constants will be given by:

$$K_c = \frac{K_f A}{y}, \quad (10)$$

$$K_e = \frac{4 K_w A_w}{l_w}, \quad (11)$$

$$K_r = \frac{A \varepsilon \sigma}{T_m}[(T_m + T_a)^4 - T_a^4] \approx 4 A \varepsilon \sigma T_a^3 \text{ for small } T_m, \quad (12)$$

$$K_n = hA, \quad (13)$$

and $$K_x = \frac{K_f A}{x} + \frac{A \varepsilon \sigma ((T_m + T_a)^4 - (T_r + T_a)^4)}{(T_m - T_r)} + h_x A \approx \quad (14)$$
$$\frac{K_f A}{x} + 4 A \varepsilon \sigma T_a^3 + h_x A \text{ for small } T_m, T_r$$

where $K_f$ is the thermal conductivity of the fluid, $A$ the planar area of the measure (or reference) element, $y$ is the distance between the measure (or reference) element and the measure cell wall, $K_w$ is the thermal conductivity of the element wire, $A_w$ is the cross sectional area of the wire, $l_w$ is the length of the element wire before reaching the electrode supports at ambient temperature, $\varepsilon$ is the radiative emissivity of the substrate surface, $\sigma$ is the Stefan Boltzmann constant, $T_a$ is the ambient temperature, $h$ is the constant heat transfer coefficient associated with natural convective heat exchange between measure and reference elements and the measure cell wall, $x$ is the separation distance between measure and reference elements and $h_x$ is the constant heat transfer coefficient associated with natural convective heat exchange between measure and reference elements.

For simplicity the total loss constant $K_L$ will be defined such that:

$$K_L = K_c + K_e + K_r + K_n \quad (15)$$

This means that equation 8 can be rewritten as:

$$P_m = K_L T_m + K_x (T_m - T_r) + K_{cal} F T_m - P_a \quad (16)$$

In a similar way, the reference element power $P_r$, will be given by:

$$P_r = K_L T_r - K_x (T_m - T_r) \quad (17)$$

Using equations (6) and (7), equations (16) and (17) can be rewritten as:

$$P_m = K_L(T_{av} + \Delta T + \Delta T_o) + 2K_x(\Delta T + \Delta T_o) + K_{cal} F(T_{av} + \Delta T + \Delta T_o) - P_a \quad (18)$$

and $$P_r = K_L(T_{av} - \Delta T - \Delta T_o) - 2K_x(\Delta T + \Delta T_o) \quad (19).$$

Since $\Delta T$ is negative and $K_x$ is positive, the power loss of the measure element is reduced due to the heat donated from the reference element and so the rate of temperature reduction of the measure element with flow is also reduced, which in turn enhances common mode noise rejection and extends the working flow range.

The difference in power generated by the two elements is given by equation 18 minus equation 19:

$$P_m - P_r = 2K_L(\Delta T + \Delta T_o) + 4K_x(\Delta T + \Delta T_o) + K_{cal} F(T_{av} + \Delta T + \Delta T_o) - P_a \quad (20)$$

and at zero flow ($F=0$, $\Delta T=0$, $P_a=0$), $$(P_m - P_r)_o = 2\Delta T_o(K_L + 2K_x) \quad (21)$$

where the lower case "0" after the brackets indicates those values at zero flow. Ideally, for perfect, in phase, common mode noise rejection, there should be no net power difference at zero flow, i.e. the measure and reference elements should always be at identical temperatures. However, if the element temperatures are not perfectly matched due to, for example, small differences in element resistor values, then the exchange coefficient will try to bring them into thermal equality, i.e. as $K_x$ increases, $\Delta T_o$ decreases.

Let us define two ratios, the exchange/loss ratio:

$$R_x = \frac{2K_x}{K_L} \quad (22)$$

and the exchange/flow ratio:

$$R_F = \frac{K_x(T_m - T_r)}{K_{cal} F T_m} = \frac{2K_x}{K_{cal} F \left(1 + \frac{T_{av}}{(\Delta T + \Delta T_o)}\right)} \quad (23)$$

For good common mode noise rejection via thermal symmetry, a high value for $R_x$ is desirable (preferably $R_x \geq 1$), so that the net exchange power term between the elements is not dominated by the other thermal losses to the measure cell walls. However, $R_F$ should not be too high (preferably $R_F \leq 1$) otherwise the net exchange of heat between the elements will dominate the power change to the measure element due to the fluid flow and the sensitivity to flow will be reduced excessively.

Returning to equations 18 and 19, the bridge power, $P_b$, will be given by their summation:

$$P_b = P_m + P_r = 2K_L T_{av} + K_{cal} F(T_{av} + \Delta T + \Delta T_o) - P_a \quad (24)$$

However, under conditions of no flow ($F=0$, $\Delta T=0$, $P_a=0$), $P_b = P_o$ and $T_{av} = T_o$ and therefore $K_L$ can be determined from equation 24 as:

$$K_L = \frac{P_o}{2T_o} \quad (25)$$

Equation (24) can be rearranged for solving $F$ and substituting for $K_L$ from equation 25:

$$F = \frac{(P_b + P_a) - P_o\left(\frac{T_{av}}{T_o}\right)}{K_{cal}(T_{av} + \Delta T + \Delta T_o)} \quad (26)$$

The volume flow rate can be found from equations 9 and 26.

$$\frac{dV}{dt} = \frac{(P_b + P_a) - P_o\left(\frac{T_{av}}{T_o}\right)}{\rho C_p K_{cal}(T_{av} + \Delta T + \Delta T_o)} + c_o \tag{27}$$

$$= \frac{(P_m + P_r + P_a) - (P_m + P_r + P_a)_o\left(\frac{(T_m + T_r)}{(T_m + T_r)_o}\right)}{\rho C_p K_{cal} T_m} + c_o$$

where the lower case "0" after the brackets indicates those values at zero flow. Note that equation 27 is still valid for any of the alternative embodiments described in the the detailed description of exemplary embodiments, excepting that described in the last sentence, which uses power differences between $P_m$ and $P_r$ and so would require the $(P_m + P_r)$ terms in equation 27 to be replaced by $(P_m - P_r)$ terms and $P_a = 0$.

The bridge offset voltage, $S_b$, is given by:

$$S_b = \alpha I_b R_b (\Delta T + \Delta T_o) \tag{28}$$

where $I_b$ is the current through the bridge. By rearrangement, $\Delta T + \Delta T_o$ at any flow rate is given by:

$$\Delta T + \Delta T_o = \left(\frac{S_b}{\alpha I_b R_b}\right) \tag{29}$$

and so from equations 7 and 29, equation 27 becomes:

$$\frac{dV}{dt} = \frac{\alpha I_b((P_b + P_a)(R_o - R_a) - P_o(R_b - R_a))}{\rho C_p K_{cal}(R_o - R_a)\left(\left(\frac{I_b(R_b - R_a)}{R_a}\right) + \left(\frac{S_b}{R_b}\right)\right)} + c_o \tag{30}$$

This equation should hold true for all working formats. Depending on the origin for the intrinsic voltage offset with zero flow, $S_b$ may be replaced by $(S_b - S_o)$ in the following equations where $S_o$ is the voltage offset with zero flow.

Naturally, $I_b$ can be replaced in the above equation or following equations with the bridge voltage via Ohm's Law ($V_b = I_b R_b$). Some special cases will now be considered. If no additional power is supplied to the measure element ($P_a = 0$), then equation 30 becomes:

$$\frac{dV}{dt} = \frac{\alpha I_b(P_b(R_o - R_a) - P_o(R_b - R_a))}{\rho C_p K_{cal}(R_o - R_a)\left(\left(\frac{I_b(R_b - R_a)}{R_a}\right) + \left(\frac{S_b}{R_b}\right)\right)} + c_o \tag{31}$$

This equation can be used for constant resistance, constant current, constant voltage and constant power bridge formats.

For the special case of constant resistance drive ($R_b = R_o$), then equation (31) becomes:

$$\frac{dV}{dt} = \frac{\alpha I_b R_o (I_b^2 - I_o^2)}{\rho C_p K_{cal}\left(\left(\frac{I_b(R_o - R_a)}{R_a}\right) + \left(\frac{S_b}{R_o}\right)\right)} + c_o \tag{32}$$

However, as will be illustrated in the comparison of theory with experimental results, since the summation of terms in the denominator in certain formats is approximately constant under conditions of flow, then for a particular fixed fluid composition, equation 32 may be simplified to:

$$\frac{dV}{dt} = K_R I_b (I_b^2 - I_o^2) + c_o \tag{33}$$

where the constant $K_R$ is given by:

$$K_R = \frac{\alpha R_o}{\rho C_p K_{cal}\left(\left(\frac{I_b(R_o - R_a)}{R_a}\right) + \left(\frac{S_b}{R_o}\right)\right)} \tag{34}$$

$$= \frac{\alpha R_o}{\rho C_p K_{cal}\left(\left(\frac{I_o(R_o - R_a)}{R_a}\right) + \left(\frac{S_o}{R_o}\right)\right)}$$

However, if no additional heat is applied ($P_a = 0$), the flow rate can also be calculated from just the offset voltage or bridge voltage, current, resistance or power terms via a pragmatic approach such as by using a polynomial, (poly) exponential or other appropriate fit, using least squares method or similar to find the appropriate coefficients. The equation coefficients can be set via calibration routines. For example, the fluid flow rate (dV/dt) can be related to a measured parameter of the Wheatstone bridge via an $n^{th}$ order polynomial equation of the form:

$$\frac{dV}{dt} = a_o + a_1(J - J_o) + a_2(J - J_o)^2 \ldots + a_n(J - J_o)^n \tag{35}$$

or $$\frac{dV}{dt} = b_o + b_1 J + b_2 J^2 \ldots + b_n J^n \tag{36}$$

where the $a_n$ and $b_n$ values are constants determined at calibration, J is a measurement parameter at the measured flow rate, which may be substituted by either the bridge voltage, current, offset voltage, power or resistance and the $J_o$ refers to that same parameter value at zero flow. Typically, for gases, a third or fourth order polynomial will suffice for a reasonable fit.

If a feedback circuit is used to maintain the bridge offset at a fixed value, normally the zero flow value ($S_b = 0$ or $S_b = S_o$ at all flow rates), then equation 30 simplifies to:

$$\frac{dV}{dt} = \frac{\alpha R_a}{\rho C_p K_{cal}}\left(\frac{(P_b + P_a)}{(R_b - R_a)} - \frac{P_o}{(R_o - R_a)}\right) + c_o \tag{37}$$

This will be valid for any bridge drive mode, however, in the special case of constant bridge resistance circuit ($R_b = R_o$, $P_b = P_o$), this simplifies to:

$$\frac{dV}{dt} \approx \frac{\alpha R_a P_a}{\rho C_p K_{cal}(R_o - R_a)} + c_o \tag{38}$$

so that, for a fixed fluid composition:

$$\frac{dV}{dt} \approx K_{Ra}P_a + c_o \tag{39}$$

where $P_a$ can be measured directly from the feedback circuit and $K_{Ra}$ is a calibration constant, given by:

$$K_{Ra} \approx \frac{\alpha R_a}{\rho C_p K_{cal}(R_o - R_a)} \tag{40}$$

So that the fluid flow will be directly proportional to the additional heat applied.

As before, a pragmatic approach may also be applied for any non-linearities encountered for different drive modes where a feedback circuit is used and equation 36 can be utilised, where in this case J is be replaced by $P_a$. Equation 35 can also be used where $J_o$ is replaced by the value of $P_a$ at zero flow, where $P_a$ is used to drive the bridge offset towards a fixed value, rather than to maintain its intrinsic offset value at zero flow.

From equation 17, the reference element power will be given by:

$$P_r = \left(K_{LL} + \frac{K_f A}{y}\right)T_r - \left(K_{xx} + \frac{K_f A}{x}\right)(T_m - T_r) \tag{41}$$

where $$K_{LL} = (K_e + K_r + K_n) \text{ and} \tag{42}$$

$$K_{xx} = (4A\varepsilon\sigma T_a^3 + h_x A) \tag{43}$$

Equation 41 can be rearranged in order to find an expression for the fluid conductivity, $K_f$, as:

$$K_f = \frac{(P_r + K_{xx}(T_m - T_r) - K_{LL}T_r)}{A\left(\left(\frac{T_r}{y}\right) - \left(\frac{T_m - T_r}{x}\right)\right)} \tag{44}$$

This expression is valid for all the formats described in this detailed description of the exemplary embodiments.

Returning to the Wheatstone bridge arrangement, if feedback is used to maintain the offset voltage at the null value at zero flow, then approximately equal power will be dissipated by the measure and reference elements by the Wheatstone bridge circuit and so:

$$P_4 = \tfrac{1}{2}I_b^2 R_b(1 - \alpha\Delta T_o) \tag{45}$$

which means that equation 44 can be rewritten as:

$$K_f = \frac{\tfrac{1}{2}I_b^2 R_b(1 - \alpha\Delta T_o) + 2\Delta T_o K_{xx} - K_{LL}(T_o - \Delta T_o)}{A\left(\frac{(T_o - \Delta T_o)}{y} - \frac{2\Delta T_o}{x}\right)} \tag{46}$$

For small $\Delta T_o$, from equation 46, $K_f$ can be approximated to:

$$K_f = \frac{y}{A}\left(\frac{\tfrac{1}{2}I_b^2 R_b}{T_o} - K_{LL}\right) = \frac{y}{A}\left(\frac{P_r}{T_r} - K_{LL}\right) \tag{47}$$

In any case, equation 46 can be simplified to:

$$K_f = \beta(\tfrac{1}{2}I_b R_b - S_o) - L_o \tag{48}$$

where $\beta$ is a constant given by:

$$\beta = \frac{1}{A\left(\frac{(T_o - \Delta T_o)}{y} - \frac{2\Delta T_o}{x}\right)} \tag{49}$$

and $$L_o = K_{LL}(T_o - \Delta T_o) - 2\Delta T_o K_{xx}. \tag{50}$$

Note that where conduction losses through the wires to the electrodes and radiative losses dominate over natural convective losses thorough the fluid, $L_o$ will be approximately constant. When $I_b R_b \gg S_o$, equation 48 approximates to:

$$K_f = \beta(\tfrac{1}{2}I_b^2 R_b - L_o) \tag{51}$$

In the case of constant resistance drive ($R_b = R_o$), equation 51 approximates to:

$$K_f = \beta(\tfrac{1}{2}I_b^2 R_b - L_o) \tag{52}$$

So that measured changes in $K_f$ depend solely on the value of $I_b$. The values of $\beta$ and $L_o$ may be determined via calibration with known fluid thermal conductivities.

$K_f$ can also be calculated where no additional heating is added to the measure disc ($P_a = 0$). Returning to equation 44 and using equation 19 gives:

$$K_f = \frac{\left(\tfrac{1}{2}I_b^2 R_b(1 - \alpha(\Delta T + \Delta T_o)) + 2K_{xx}(\Delta T + \Delta T_o) - K_{LL}(T_{av} - (\Delta T + \Delta T_o))\right)}{A\left(\left(\frac{(T_{av} - (\Delta T + \Delta T_o))}{y}\right) - \left(\frac{2(\Delta T + \Delta T_o)}{x}\right)\right)} \tag{53}$$

Using equations 7, 28 and 29, equation 53 can be rewritten as:

$$K_f = \frac{\left(\tfrac{1}{2}\alpha I_b(I_b R_b - S_b) + 2K_{xx}\left(\frac{S_b}{I_b R_b}\right) - K_{LL}\left(\left(\frac{R_b}{R_a} - 1\right) - \left(\frac{S_b}{I_b R_b}\right)\right)\right)}{A\left(\frac{1}{y}\left(\left(\frac{R_b}{R_a} - 1\right)\left(\frac{S_b}{I_b R_b}\right)\right) - \frac{2}{x}\left(\frac{S_b}{I_b R_b}\right)\right)} \tag{54}$$

So that $K_f$ can be calculated for the different drive formats as above. Note that for a fixed fluid composition, $K_f$ will be constant and so equation 54 could be used, for example, to find S in terms of $I_b$ for a constant resistance drive circuit and so the flow behaviour could be known just from measuring the bridge current.

The thermal conductivity is a useful parameter to have since it can give information about fluid composition, especially in binary or pseudo-binary fluid mixtures (where two or more of the components in a three or more component mix have very similar thermal conductivity and mass flow properties). The overall thermal conductivity of a fluid mixture composed of N components is given by the following equation (as described, for example, in Brokaw, R. S., "Approximate formulas for viscosity and thermal conductivity of gas mixture", NASA technical report number NASA-TN-D-2502, November 1964):

$$K_f = \sum_{i=1}^{N} \frac{c_i K_i}{c_i + \sum_{j=1, j \neq i}^{j=N} c_j B_{ij}} \quad (55)$$

where $c_i$ is the fractional concentration of the $i^{th}$ component with thermal conductivity $K_i$ and $c_j$ is the fractional concentration of the $j^{th}$ component. $B_{ij}$ is a constant which is fixed for any binary fluid mixture of i and j and can be determined experimentally.

Consider a simple binary system composed of fluids 1 and 2:

$$K_f = \frac{c_1 K_1}{c_1 + (1-c_1)B_{12}} + \frac{(1-c_1)K_2}{(1-c_1) + c_1 B_{21}} \quad (56)$$

since $$c_2 = 1 - c_1. \quad (57)$$

Equation 56 can be rearranged to give a quadratic equation in descending powers of $c_1$:

$$c_1^2[K_1(B_{21}-1)+K_2(B_{12}-1)+K_f(1+B_{12}B_{21}-B_{12}-B_{21})]+ \\ c_1[K_1+K_2(1-2B_{12})+K_f(2B_{12}-B_{12}B_{21}-1)]+B_{12} \\ (K_2-K_f)=0 \quad (58)$$

and where $c_1$ will be the real solution between 0 and 1 from solving this equation, which has roots:

$$c_1 = \frac{-b \pm \sqrt{b^2 - 4ac}}{2a} \quad (59)$$

where $$a = \lfloor K_1(B_{21}-1) + K_2(B_{12}-1) + K_f(1+B_{12}B_{21}-B_{12}-B_{21}) \rfloor \quad (60)$$

$$b = \lfloor K_1 + K_2(1-2B_{12}) + K_f(2B_{12}-B_{12}B_{21}-1) \rfloor \quad (61)$$

$$c = B_{12}(K_2 - K_f) \quad (62)$$

The values for $K_{12}$ and $K_{21}$ can be found via calibration.

Alternatively, a polynomial or other appropriate mathematical function may be used to calculate the value of $c_1$, for example, of the form:

$$c_1 = d_o + d_1 K_f + d_2 K_f^2 + \ldots + d_n K_f^n \quad (63)$$

where $d_n$ are constants determined via calibration.

For certain fluid mixtures, $B_{12} = B_{21} = 1$ and so equation 56 may take a particularly simple form where:

$$c_1 = \frac{K_f - K_2}{K_1 - K_2} \quad (64)$$

In any case, if the thermal conductivity is known and providing $K_1$ and $K_2$ are sufficiently different, then the fractional concentrations of components 1 and 2 can be determined. For example, using equations 52 and 64, the concentration of component 1 in the binary mixture would be:

$$c_1 = \frac{\left(\frac{1}{2}\beta R_o\right)I_b^2 - \beta L_o - K_2}{(K_1 - K_2)} \quad (65)$$

The values for $\beta$ and $L_o$ can be found from calibration with known mixture compositions.

Once $c_1$ is known, either from $K_f$ as described above or from an independent measurement using appropriate measurement means, this would mean that the flow rate error due to gas compositional change could be automatically compensated for in binary or pseudo-binary mixtures since, from equation 9, the mass flow sensitivity is proportional to the product of the fluid density and specific heat capacity at constant pressure ($\rho C_p$). This product will be given by the expression:

$$\rho C_p = \delta_1 c_1 \rho_1 C_{p1} + (1-c_1)\delta_2 \rho_2 C_{p2} \quad (66)$$

where $\delta_1$ and $\delta_2$ are calibration constants, which for simple, small gas molecules would be approximately equal to 1 and $\rho_1$ and $\rho_2$ and $C_{p1}$ and $C_{p1}$ are the fluid densities and specific heat capacities for components 1 and 2 respectively.

If the fluid composition is determined for multiple components via independent measurements, then equation 66 can be expanded to include these terms as:

$$\rho C_p = \delta_1 c_1 \rho_1 C_{p1} + c_2 \delta_2 \rho_2 C_{p2} + \ldots + c_n \delta_n \rho_n C_{pn} \quad (67)$$

where $\delta_n$ is the calibration constant for the $n^{th}$ component, which for simple, small gas molecules would be approximately equal to 1 and $\rho_n$ and $C_{pn}$ are the fluid density and specific heat capacity for the $n^{th}$ component.

Correlation between Theory and Experimental Results

The following graphs show results for a typical device measuring gases at room temperature and pressure using 10mm diameter ceramic thick film printed disc elements with platinum resistors and separation distances between measure and reference elements and between the elements and the measure cell walls maintained below 2 mm, housed within a stainless steel measure cell with the initial temperature uplift of the elements above ambient with zero flow being 15° C. The flow sensor is driven in full Wheatstone bridge format.

Figure 13:
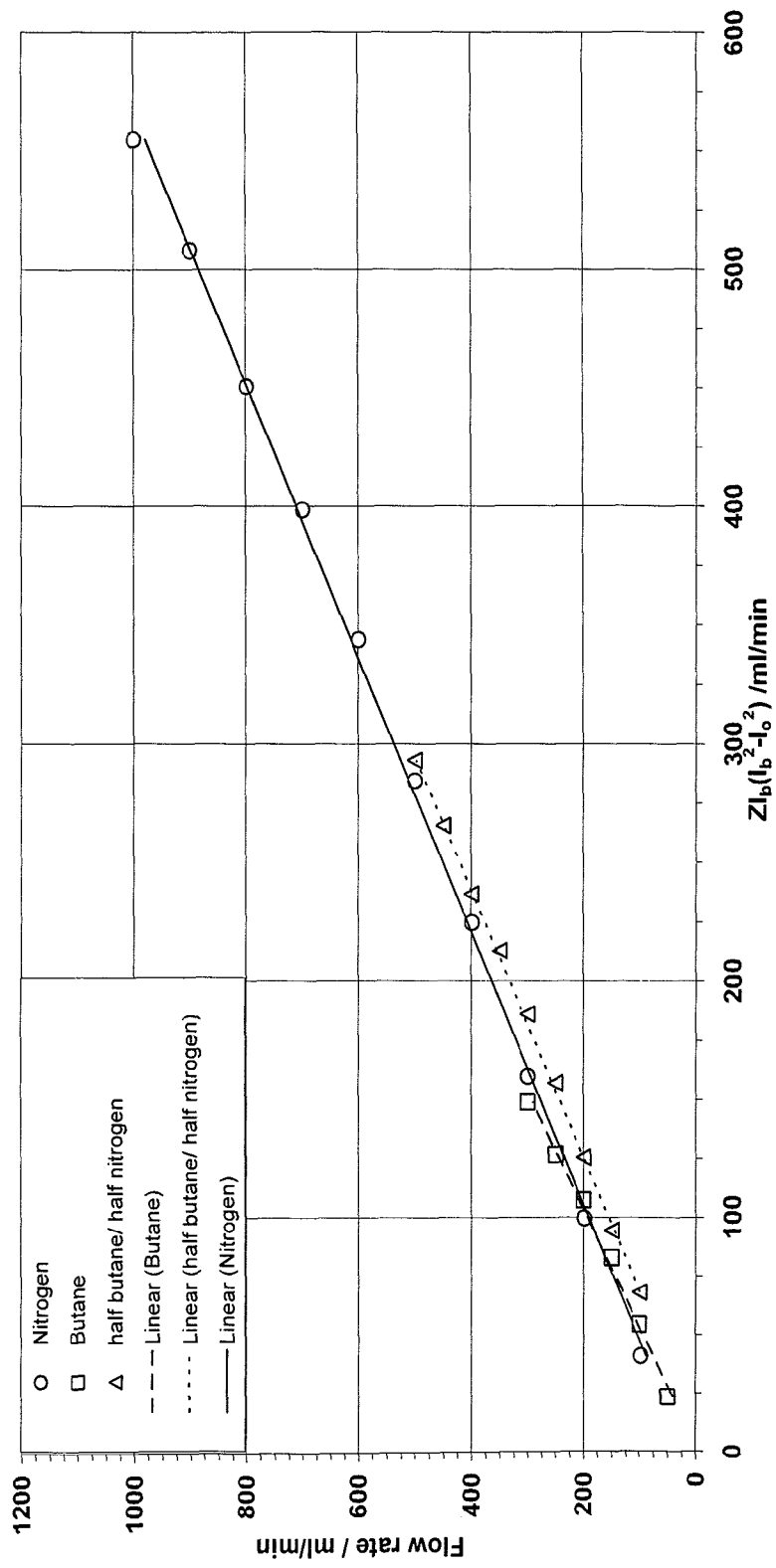
FIGS. 13-16 show the basic correlation between theory and experimental results for the embodiment illustrated in FIG. 4, for nitrogen and butane gas mixtures using constant bridge resistance mode.
Figure 14:
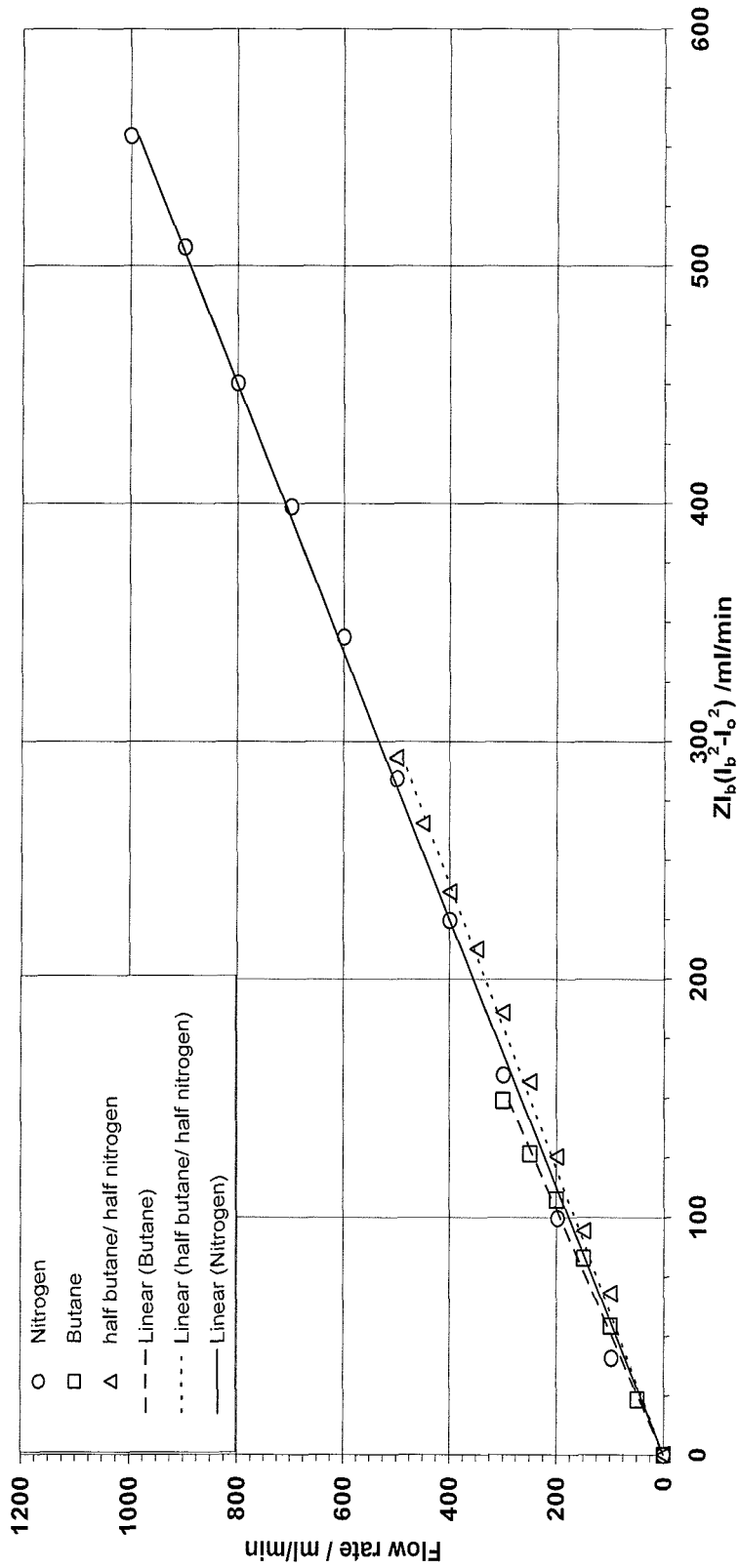
Figure 15:
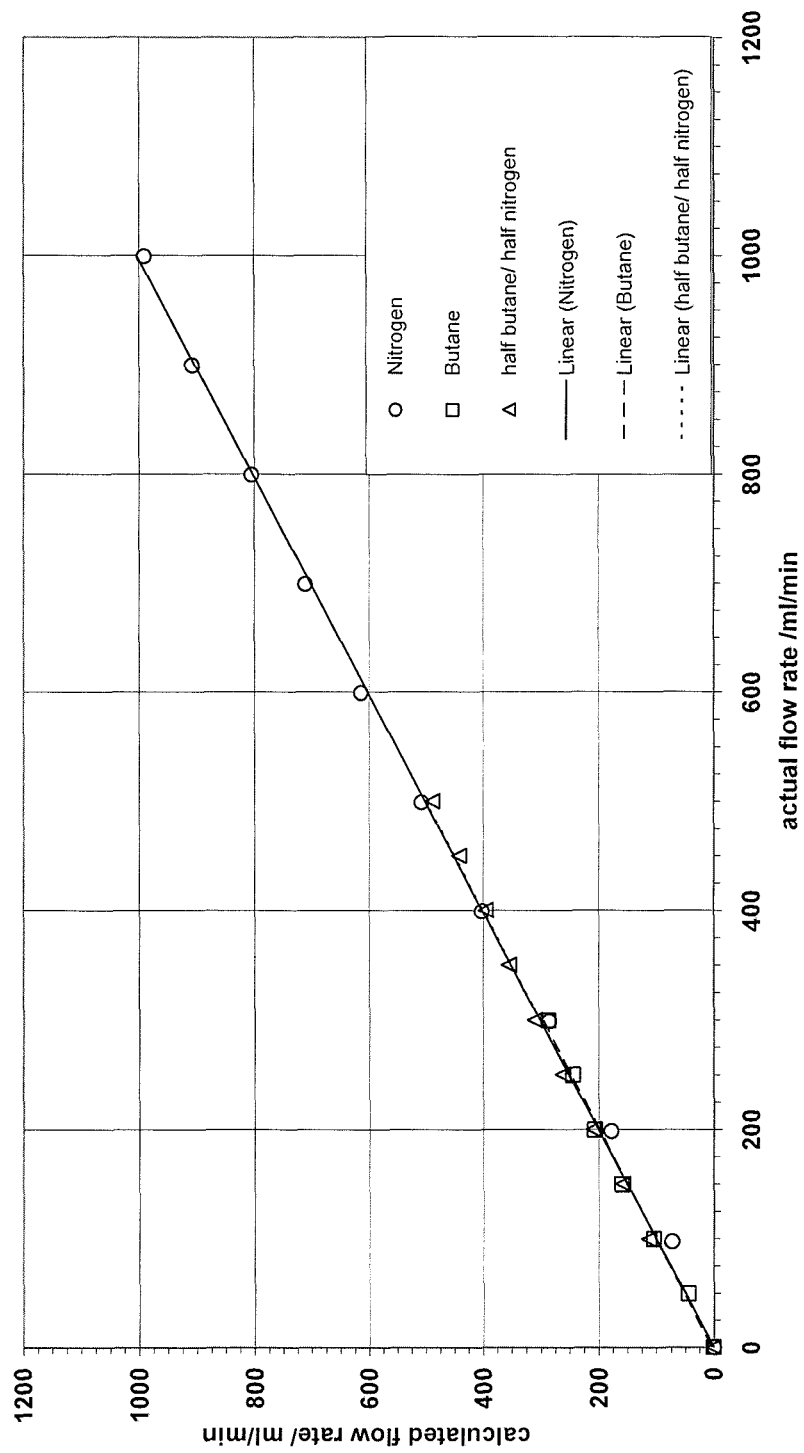
Figure 16:
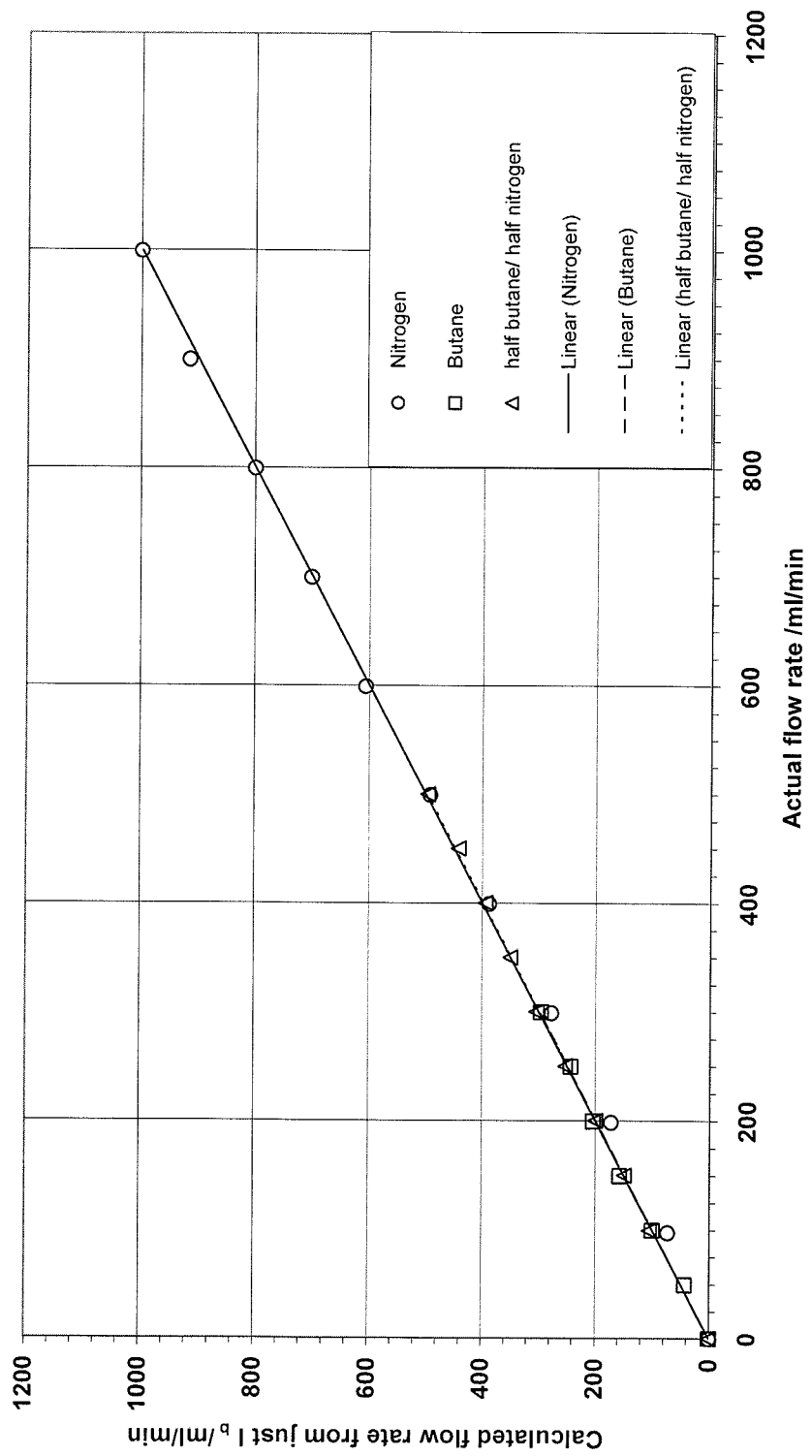

For the case of a constant resistance bridge drive ($R_b = R_o$) and no additional power ($P_a = 0$), we can see that if we rewrite equation 32 as:

$$\frac{dV}{dI} = \left(\frac{1}{K_{cal}}\right) ZI_b(I_b^2 - I_o^2) + c_o \quad (68)$$

where $$Z = \frac{\alpha R_o}{\rho C_p \left(\left(\frac{I_b(R_o - R_a)}{R_a}\right) + \left(\frac{S_b - S_o}{R_o}\right)\right)} \quad (69)$$

that a graph of flow rate dV/dt vs $ZI_b(I_b^2 - I_o^2)$ should be a straight line and have a gradient of $(1/K_{cal})$ and $c_o$ can be found from the y axis intercept. FIG. 13 shows the results for nitrogen, 50% butane/50% nitrogen and butane, excluding the zero flow rate result. It can be seen that they are all good straight line fits and the values found from linear regression indicate that $K_{cal}$ is 0.58±0.02, 0.56±0.02 and 0.50±0.06 and $c_o$ is 18±18, −23±10 and −6±24 ml/min for nitrogen, 50% butane in nitrogen and butane respectively, where the quoted uncertainties are for 95% confidence limits. This shows good correlation with theory (expected $K_{cal} \approx 0.5$ and ideally $c_o \approx 0$) and any uncertainty in flow measurement due to gas dependent $c_o$ is relatively small for flow rates above several hundred ml/min, although, as can be seen, there are large uncertainties in the values of $c_o$. If $c_o$ is fixed at zero, the values for $K_{cal}$ obtained are: 0.56±0.01, 0.60±0.01 and 0.52±0.02 for nitrogen, 50% butane in nitrogen and butane respectively, where the quoted uncertainties are for 95% confidence limits. The corresponding straight line fits are shown in FIG. 14. Since any value of $c_o$ found will be small, for ease of illustration, all future illustrations will be made taking $c_o$ as zero. An example of the calculated flow rate vs actual flow rate is shown in FIG. 15 using the values quoted above for $K_{cal}$ for a constant bridge resistance circuit. As expected a good correlation is illustrated. In the case of constant bridge resistance mode, the flow rate can also be found using equation 33 just by using the bridge current values. This is illustrated in FIG. 16 for using the term $I_b(I_b^2-I_o^2)$ multiplied by a constant. As can be seen, a good correlation is obtained.

Figure 17:
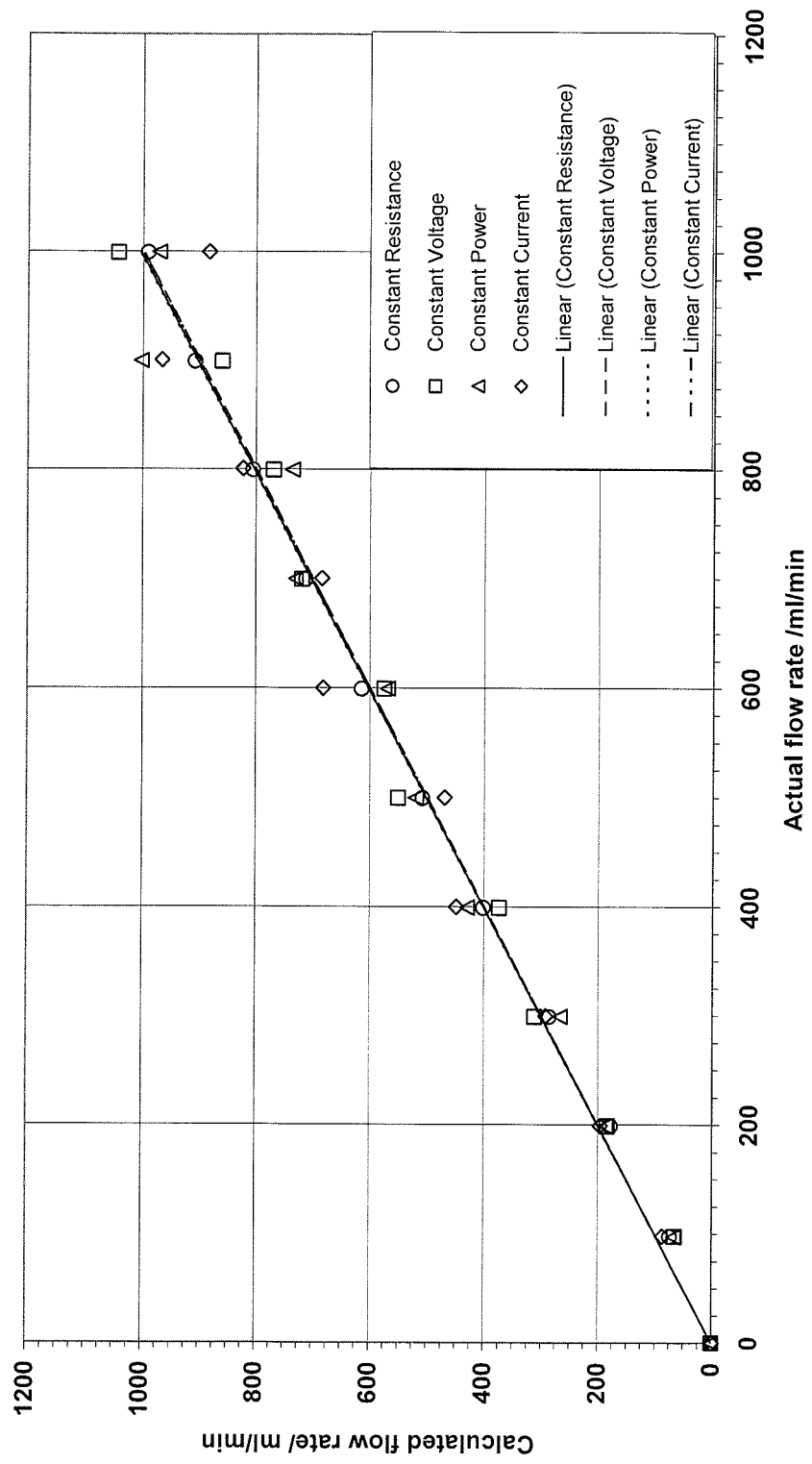
FIG. 17 shows the correlation comparison with nitrogen gas for constant current, voltage, resistance and power formats.

The general applicability of equation 31 for alternative bridge drive modes is illustrated in FIG. 17, where good correlation is seen in all cases. The values of $K_{cal}$ used in this instance for calculation are: 0.49 for constant voltage mode, 0.50 for constant power mode, 0.52 for constant current mode and 0.56 (as above) for constant resistance mode. The constant bridge voltage, power and current modes have much smaller signal changes compared to the constant bridge resistance mode, which adds significant extra power to the system with increased flow and the consequence of this for the other drive modes is greater noise on the signal at the higher flow rates.

Figure 18:
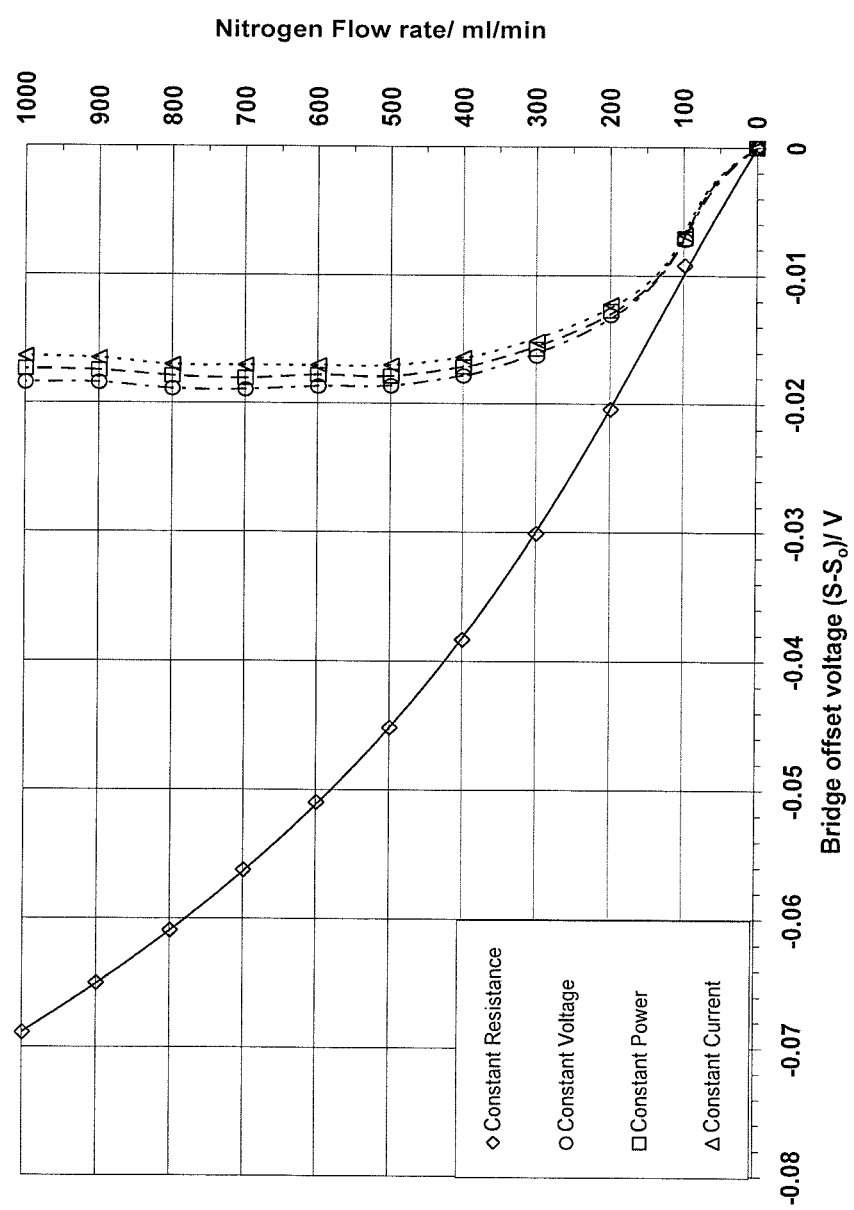
FIGS. 18-27 are illustrations of the results of using polynomial fits of bridge measurement parameters such as the bridge offset voltage, bridge voltage, bridge current, bridge resistance and bridge power in order to measure the fluid flow rate.
Figure 19:
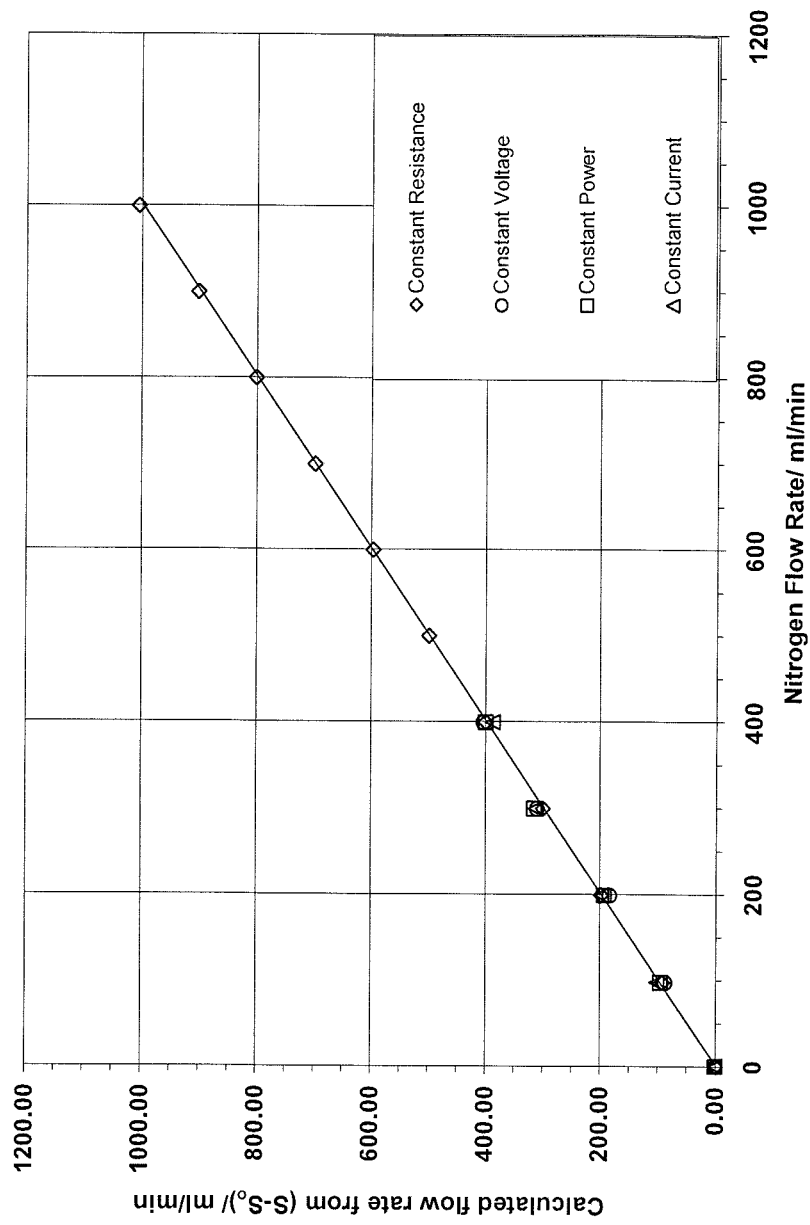
Figure 20:
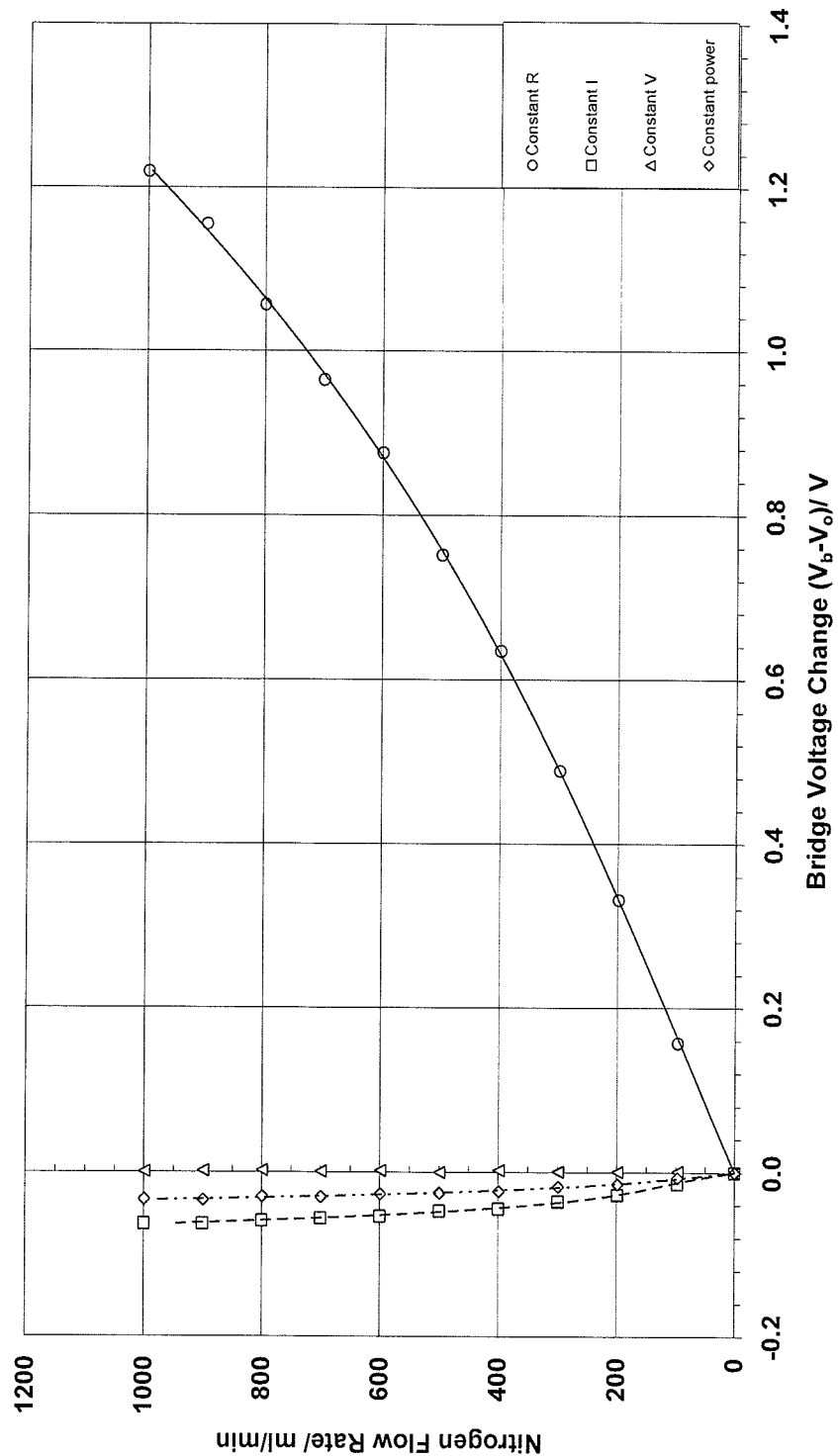
Figure 21:
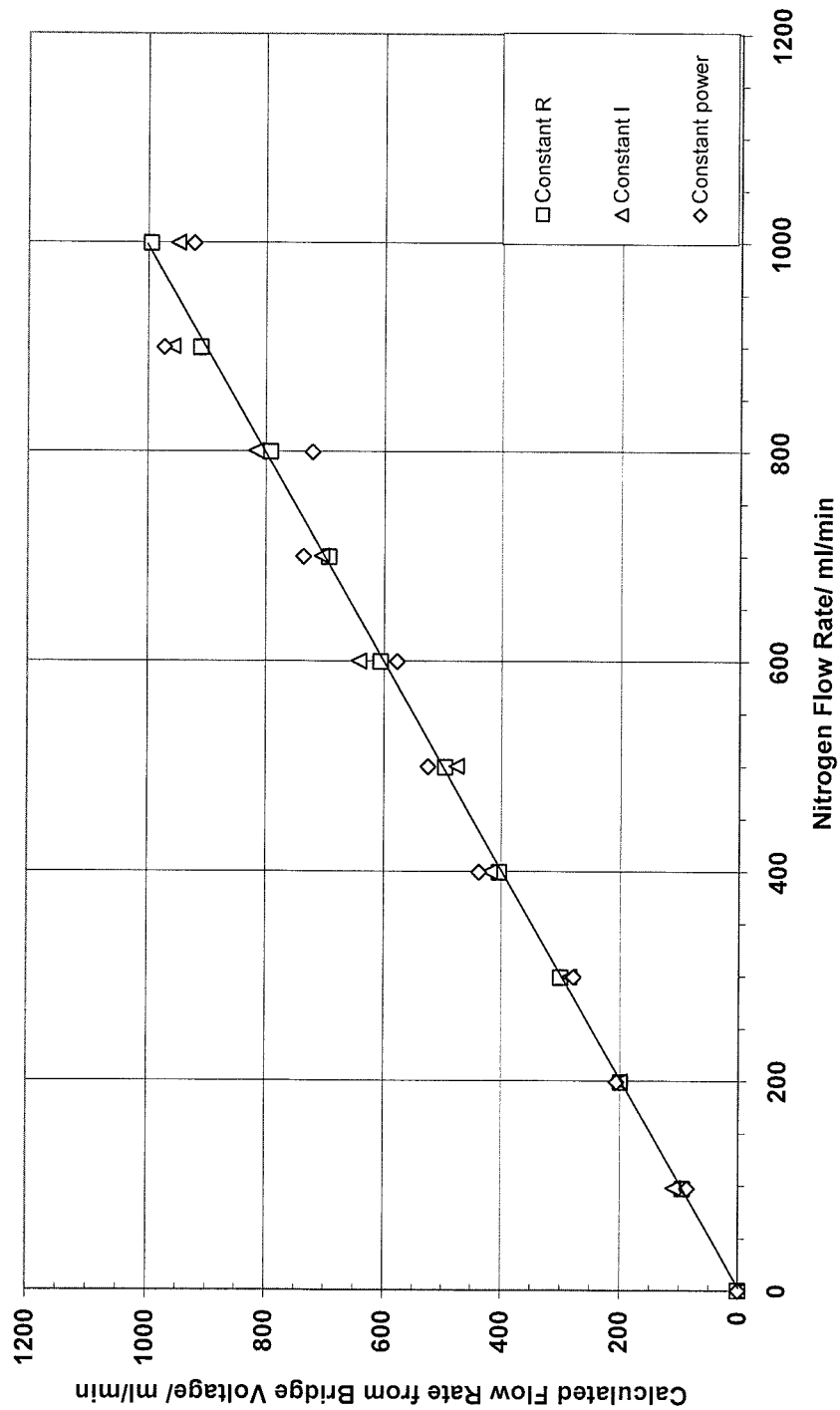
Figure 22:
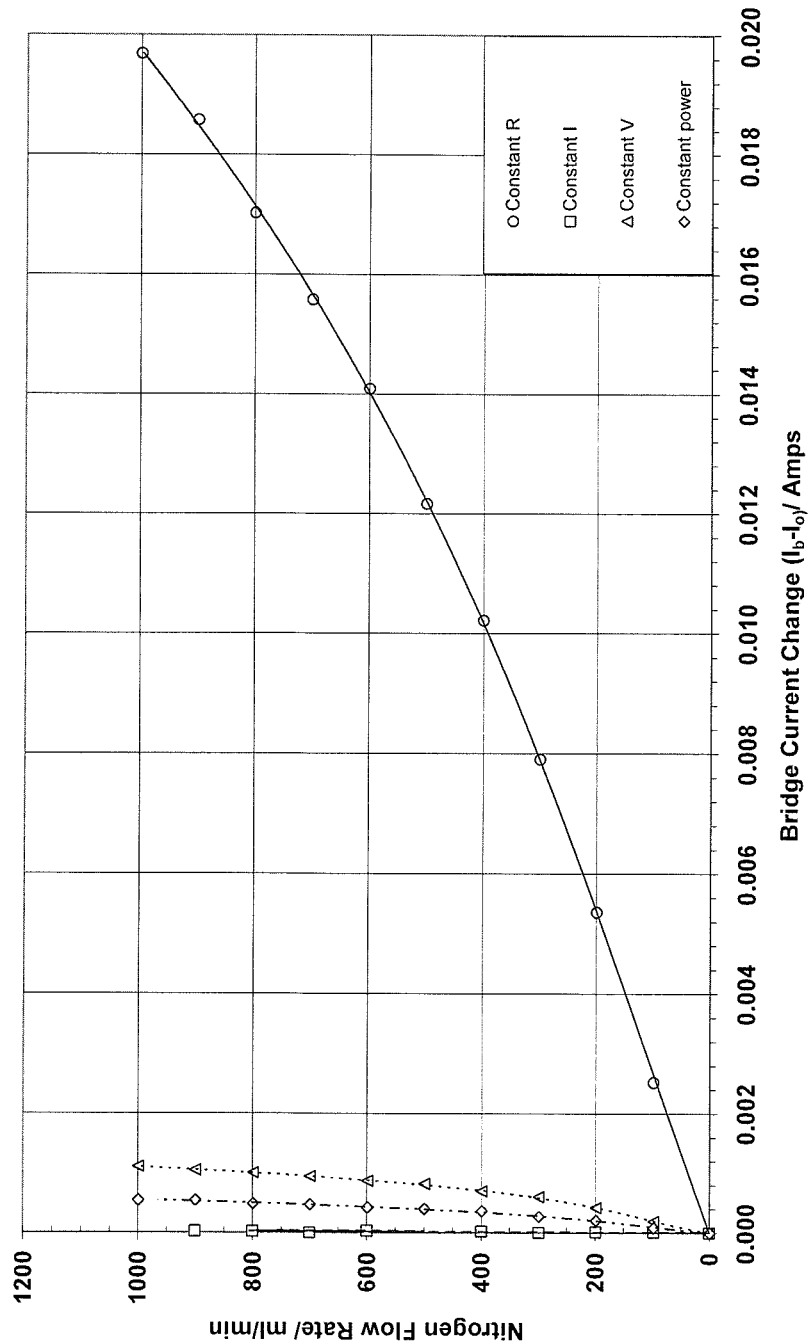
Figure 23:
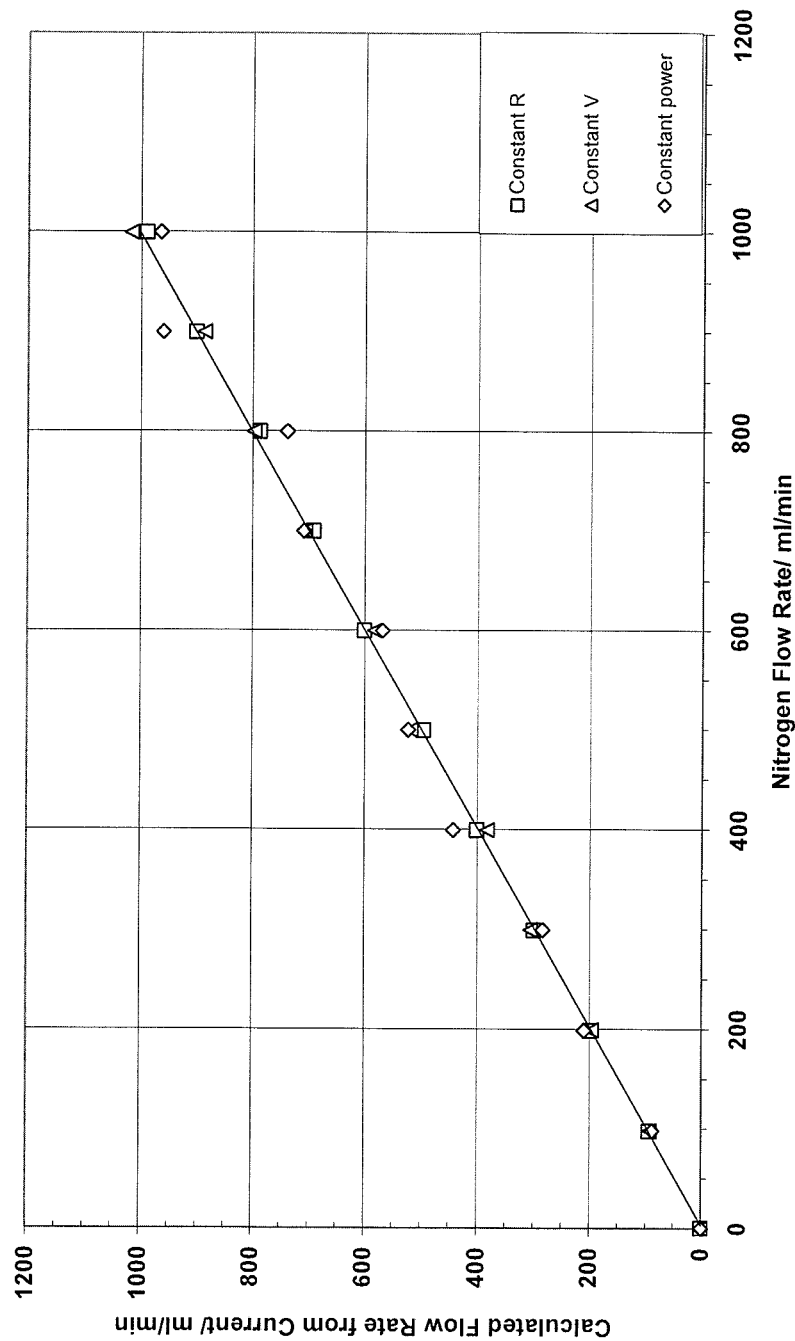
Figure 24:
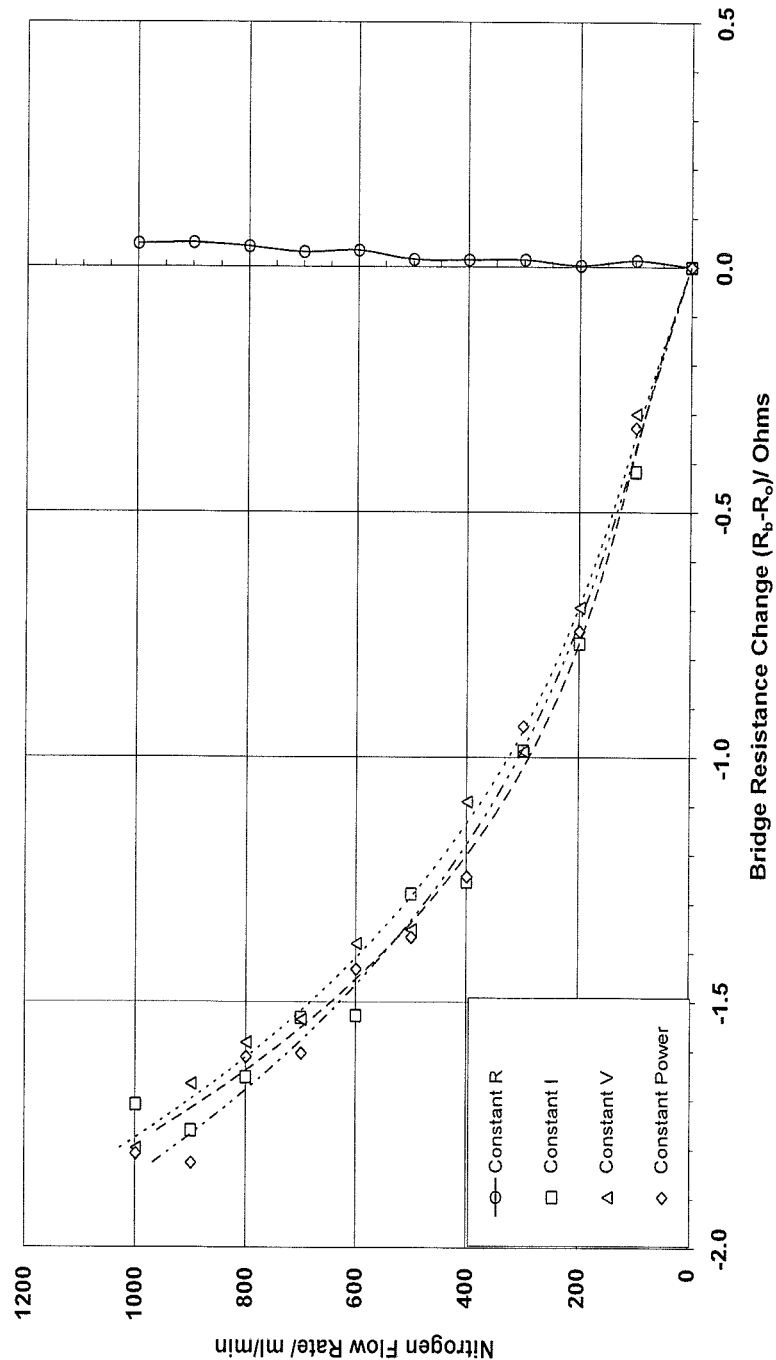
Figure 25:
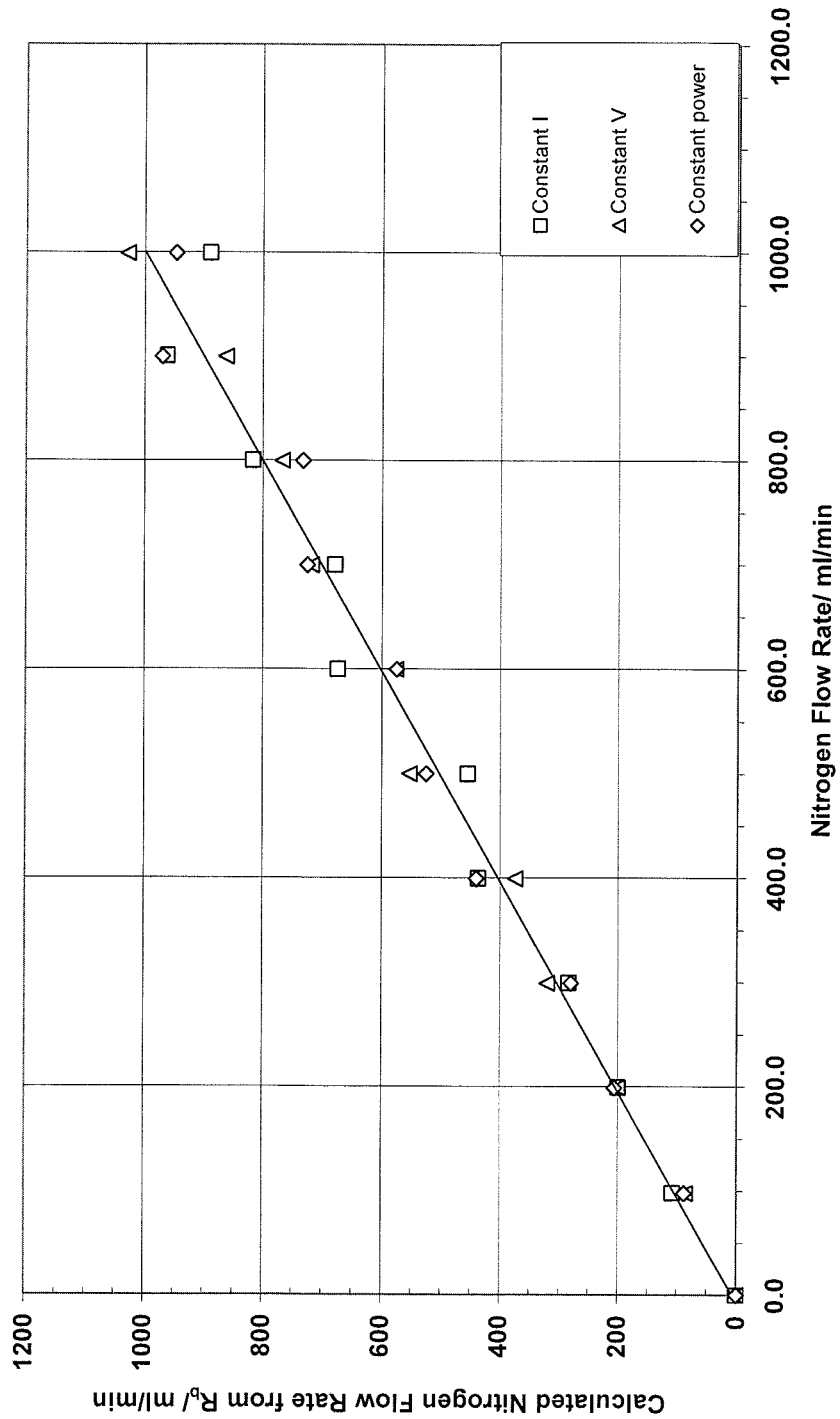
Figure 26:
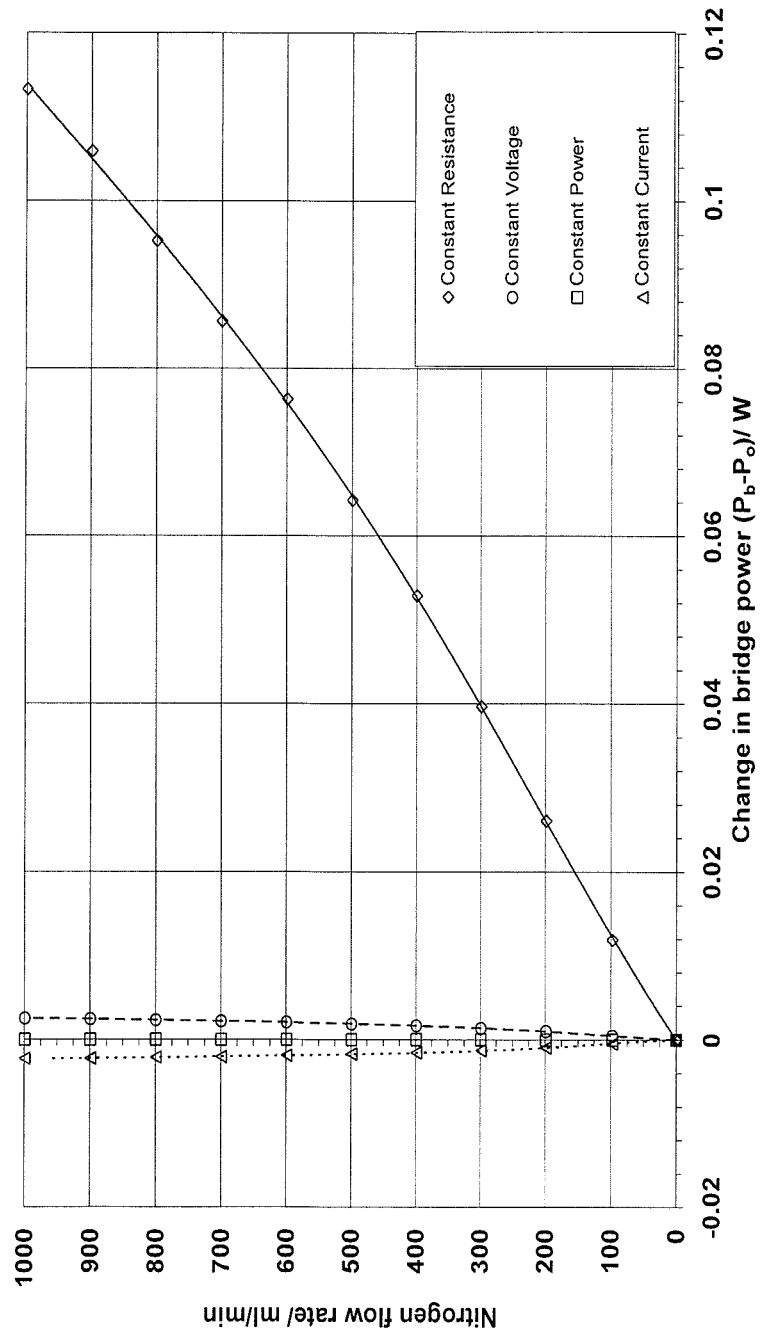
Figure 27:
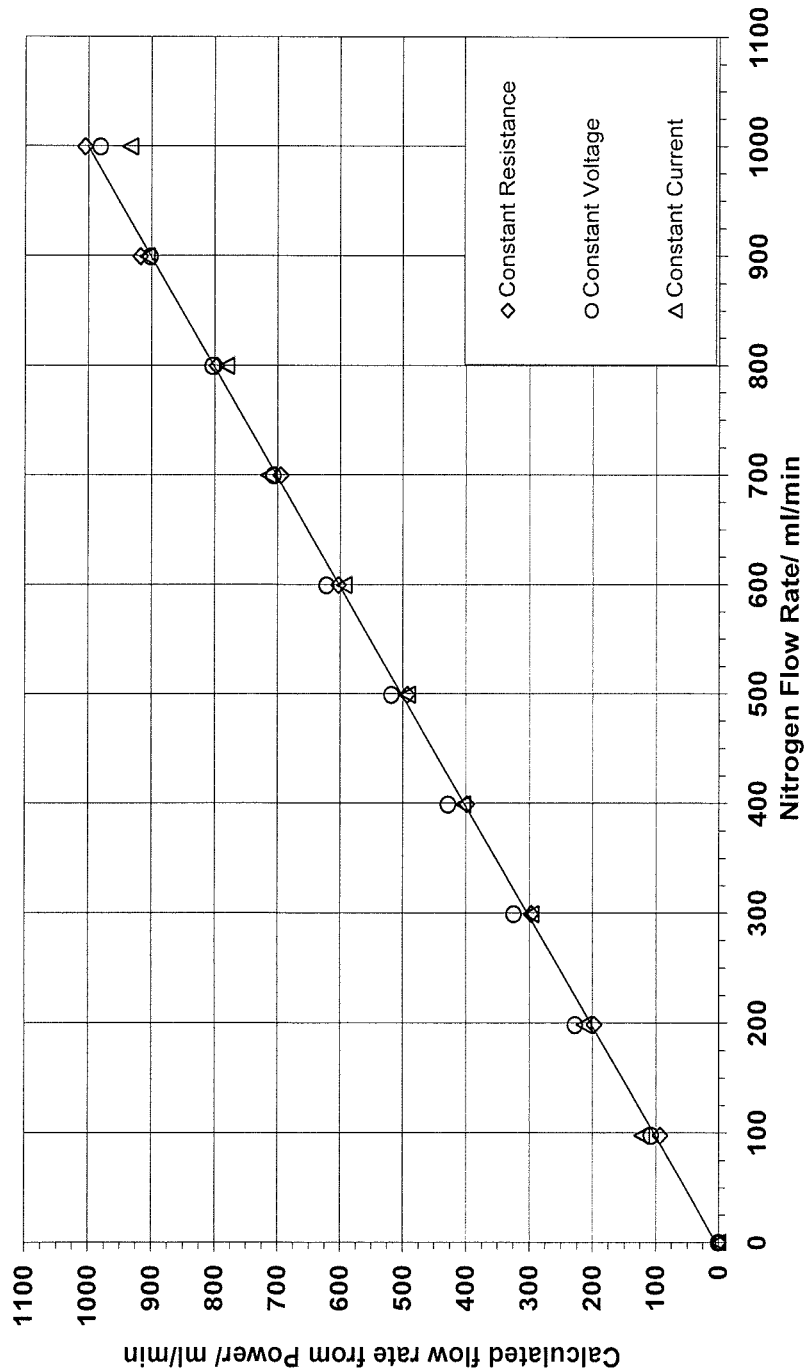

The bridge offset voltage can also be used directly as a means of measuring the flow. FIG. 18 illustrates the change of offset voltage with flow rate for nitrogen under different drive circuit regimes. It can be seen that above 500 ml/min, the signal for all the drive modes other than constant resistance mode has levelled off A third order polynomial fit can be derived for the flow rate from the offset voltage. If the fitted polynomials are used to derive the flow rate then a good correlation is obtained. This is illustrated in FIG. 19 for nitrogen for the different flow modes.

The bridge voltage, current, resistance and power can all be used to obtain polynomials from which the flow rate can be derived and these are illustrated in FIGS. 20-27. In all cases, good correlation is obtained, although smaller flow ranges are applicable for other than constant resistance mode.

The behaviour of the device using a constant offset voltage feedback circuit was also investigated using an extra resistor on the measure element. The additional power, $P_a$ vs flow rate should give a straight line graph, whose gradient, from equation 38, is equal to $$\frac{\rho C_p K_{cal}(R_o - R_a)}{\alpha R_a}.$$

Figure 28:
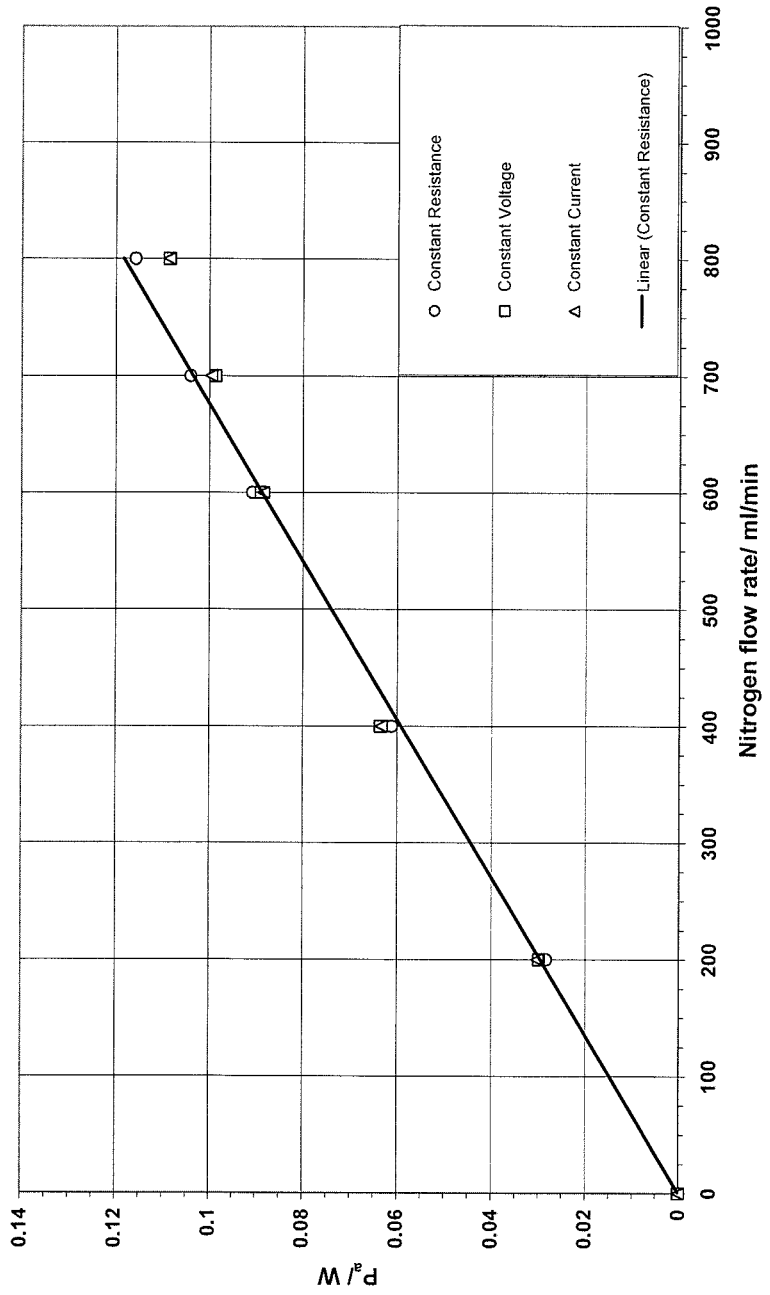
FIG. 28 shows the additional thermal power added to the measure element to maintain the Wheatstone bridge at a fixed (null) offset voltage with flow.
Figure 29:
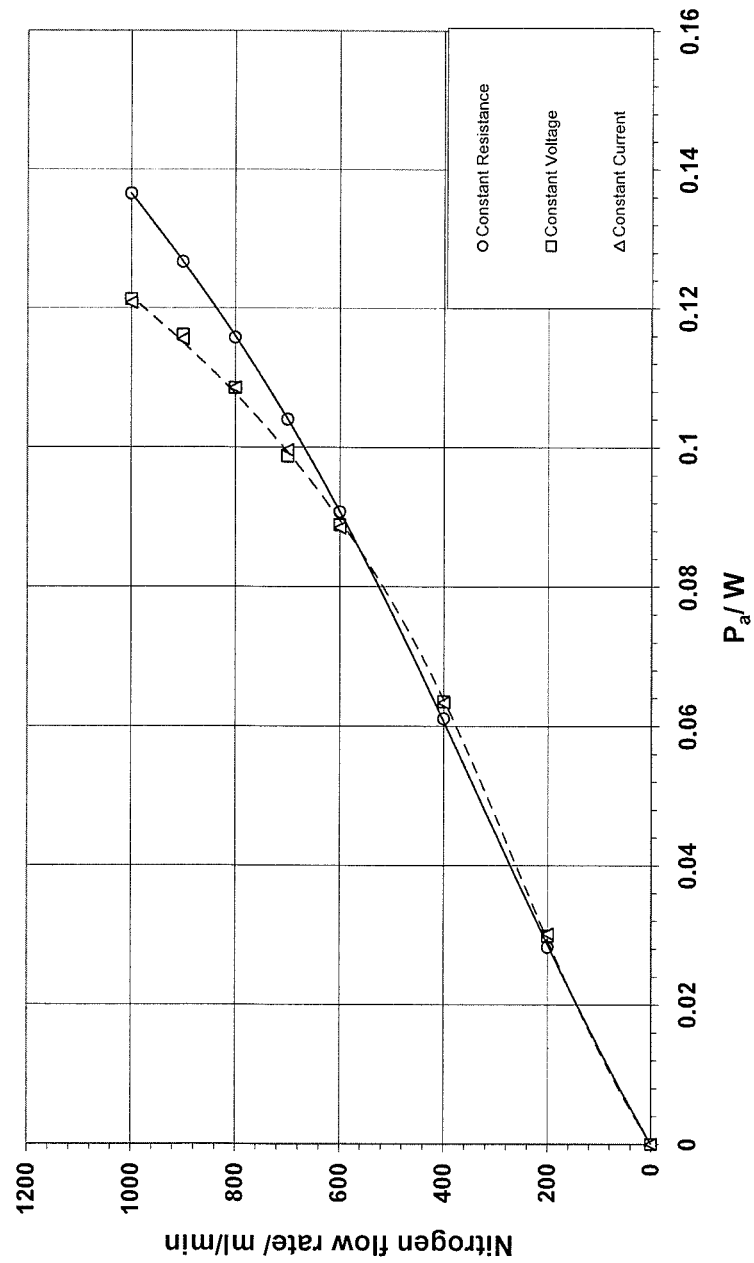
FIG. 29 shows the relationship of flow rate with additional power for higher flow rates with polynomial fits applied.
Figure 30:
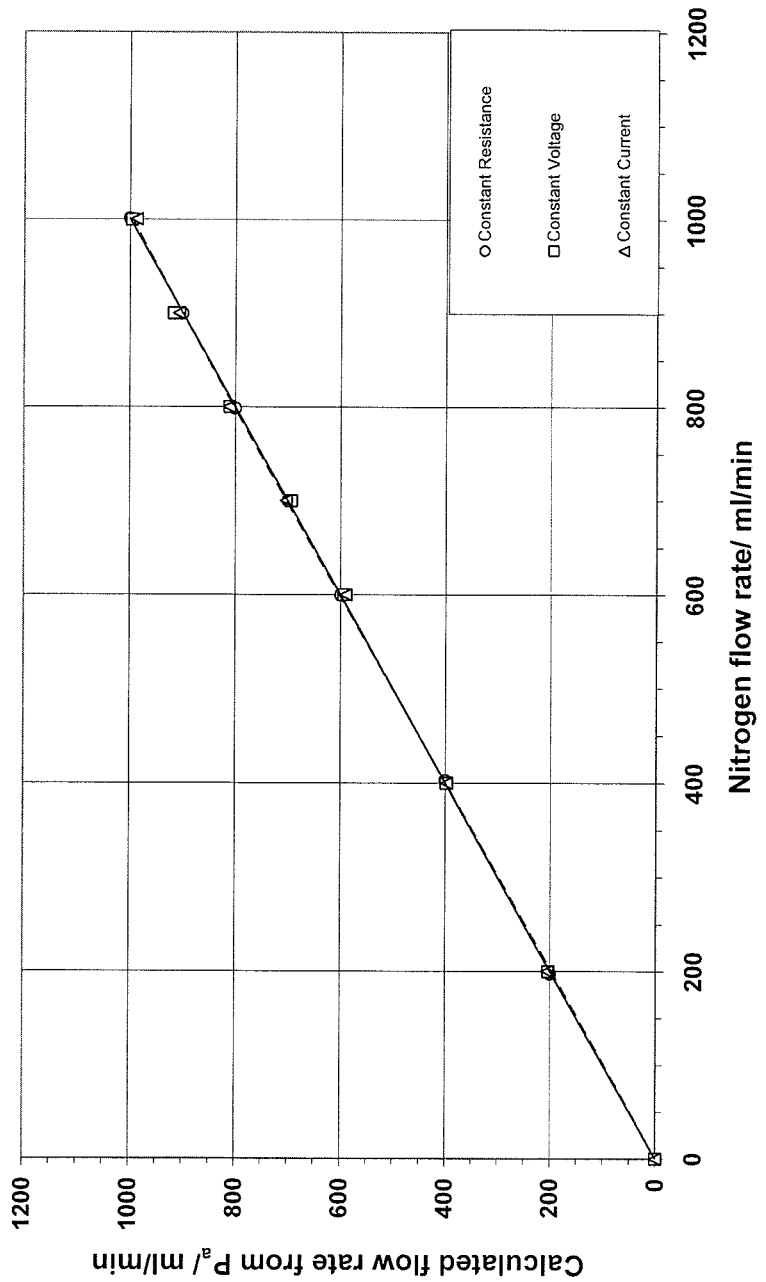
FIG. 30 shows the calculated flow rates using the additional power term against actual flow rates for nitrogen.

This is illustrated in FIG. 28, for the different drive modes. For the constant resistance mode, where a straight line graph is obtained, the calculated value of $K_{cal}$, with $c_o=0$, is 0.49±0.02 with 95% confidence. For the other drive modes using feedback, the response with flow is not quite so linear with $P_a$, since, although the elements will be held at the same relative temperature difference with respect to each other, the overall average temperature of the elements is not being actively maintained and this can lead to an overall shift in temperature with flow, especially with regard to any inhomogeneity of common mode thermal losses or flow leakage through to the reference element causing cooling of that element. In all cases, including the constant resistance mode, at high flow rates (above 800 ml/min for nitrogen in this configuration), the behaviour becomes non-linear due to flow breakthrough to the reference element and changing flow interaction between the fluid flow and the measure element and a better fit is then obtained by using the polynomial fits described by equations 35 and 36. FIG. 29 illustrates the behaviour at higher flow rates and the fits to third order polynomials using equation 36. The polynomial fits can be used to calculate the flow rate accurately as can be seen in FIG. 30.

The invention claimed is:

1. A device for measuring the flow rate of a fluid, the device comprising:
   a measure cell having at least one fluid flow inlet and at least one fluid flow outlet and providing a fluid flow path between the inlet and outlet;
   a selected one of:
   a heated measure element arranged in the measure cell so as to be exposed to heat transfer effects of fluid flowing through the fluid flow path and a heated reference element arranged in the measure cell so as to have reduced exposure to fluid flowing through the fluid flow path compared to the measure element, wherein the measure and reference elements are each heated with respect to the temperature of the measure cell; or
   a cooled measure element arranged in the measure cell so as to be exposed to heat transfer effects of fluid flowing through the fluid flow path and a cooled reference element arranged in the measure cell so as to have reduced exposure to fluid flowing through the fluid flow path compared to the measure element, wherein the measure and reference elements are each cooled with respect to the temperature of the measure cell;
   wherein the measure and reference elements are symmetrically or equivalently arranged within the measure cell for thermal exchange between the measure and reference elements, such that they experience an equivalent heat transfer environment, other than the heat transfer effects due to fluid flowing through the fluid flow path;
   at least one measurement component connected to at least one of the measure element and the reference element, for measuring at least one parameter that is indicative of the heat transfer effects of fluid flowing through the fluid flow path; and
   means for deriving a signal indicative of the fluid flow rate from the at least one measured parameter.

2. A device according to claim 1, further comprising means for maintaining the measure cell in thermal equilibrium with fluid flowing through the fluid flow path.

3. A device according to claim 2, wherein the means for maintaining thermal equilibrium is a heat exchanger.

4. A device according to claim 1, wherein the device further includes a heater arranged to pre-heat incoming fluid.

5. A device according to claim 1, wherein the measure element and reference element have substantially equal thermal properties.

6. A device according to claim 5, wherein the measure element and reference element have equal dimensions, electrical conduction and thermal conduction.

7. A device according to claim 1, wherein the measure element and reference element are held rigidly in position by electrodes that electrically interconnect the measure and reference elements.

8. A device according to claim 1, wherein the measure element is arranged in the measure cell to substantially shield the reference element from direct fluid flow within the fluid flow path.

9. A device according to claim 1, wherein a fraction of the fluid flow is directed towards the reference element, said fraction being a reduced fraction compared with the fraction of fluid flow directed towards the measure element.

10. A device according to claim 1, wherein the measure element and reference element each comprises one or more printed resistor wires on an electrical insulator.

11. A device according to claim 1, wherein the measure element and reference element comprise a pair of parallel and concentric planar substrates having one or more resistors thereon.

12. A device according to claim 1, comprising a heat exchanger that is arranged between the measure and reference elements to enable exchange of heat between the measure and reference elements.

13. A device according to claim 12, including a heat exchange controller for adjusting the thermal resistance of the heat exchange between the measure and reference elements, to adjust device sensitivity.

14. A device according to claim 1, wherein the measure and reference elements are electrically connected to each other within a Wheatstone bridge arrangement or a voltage divider arrangement.

15. A device according to claim 14, wherein the measure and reference elements are electrically connected to each other within a voltage divider arrangement and further comprising a processor and program code for controlling the processor to calculate an output voltage of the voltage divider.

16. A device according to claim 14, wherein the Wheatstone bridge or voltage divider arrangement comprises electrical circuitry including at least one measurement component for measuring at least one of a Wheatstone bridge or voltage divider current, voltage, offset voltage or voltage divider midpoint voltage, power and resistance.

17. A device according to claim 14, comprising a feedback circuit, using the Wheatstone bridge offset voltage or voltage divider midpoint voltage to electrically energise an additional heating means to add additional heat to the measure element to maintain the offset voltage or voltage divider midpoint voltage at a constant value; and means for measuring the thermal power supplied by the additional heating means, as an indication of flow rate.

18. A device according to claim 17, wherein the additional heating means is a resistor formed on the measure element.

19. A device according to claim 14, comprising drive circuitry for driving a Wheatstone bridge or voltage divider in constant voltage mode, constant current mode, constant power mode or constant resistance mode.

20. A device according to claim 1, further comprising a first heating element disposed on the measure element and a second heating element disposed on the reference element, wherein said first and second heating elements are driven at substantially identical power, current or voltage, by one or more circuits, and the temperature difference between measure and reference elements is used as an indication of flow rate.

21. A device according to claim 20, wherein the measure and reference elements are resistors and the temperatures of the measure and reference elements are determined from their resistance values with flow.

22. A device according to claim 20, wherein the temperatures of measure and reference elements are determined using temperature sensing devices mounted on the measure and reference elements, such as thermocouples, thermistors, resistance thermometers or other suitable means.

23. A device according to claim 20, wherein an additional, independent, heating component is present on the measure element, whereby said additional power provided to maintain both measure and reference elements at the same temperature is related to the fluid flow rate.

24. A device according claim 20, wherein the measure and reference elements are aligned concentric and parallel, wherein the measure element shields the reference element from fluid flow and wherein the thermal resistance between the measure and reference elements is adjusted by varying the separation distance between the measure and reference elements.

25. A device according claim 20, wherein the thermal resistance between the measure and reference elements is adjusted by varying the thermal conductivity and dimensions of the materials thermally connecting them.

26. A device according to claim 1, wherein the measure and reference elements are maintained at substantially identical, elevated temperatures with respect to the ambient by suitable independent circuits, whereby the signal is related to the power difference between the measure and reference elements to maintain said elements at the required temperature, said power difference being related to the fluid flow rate.

27. A device according to claim 26, wherein the measure and reference elements are resistors and the temperatures of the measure and reference elements are determined from their resistance values.

28. A device according to claim 26 wherein the temperatures of measure and reference elements are determined using temperature sensing devices mounted on the measure and reference elements such as thermocouples, thermistors, resistance thermometers or other suitable means.

29. A device according to claim 1, further comprising means for determining the thermal conductivity of the fluid flowing through the fluid flow path, wherein the reference element power is used to determine the thermal conductivity of the fluid.

30. A device according to claim 29, further comprising means for determining the fluid composition of a binary or pseudo-binary fluid mixture, using the thermal conductivity of the fluid.

31. A device according to claim 29, comprising means for determining an auto-correction for fluid flow rate with fluid composition from the thermal conductivity of the fluid.

32. A device according to claim 31, comprising means for using said auto-correction function to produce a corrected signal for the flow rate independent of flow composition.

33. A device according to claim 1, comprising means for determining an auto-correction function for fluid flow rate with fluid composition, for a known fluid composition.

34. A device according to claim 1, comprising means for controlling a heat exchange between the measure and reference elements by varying the thermal resistance between the measure and reference elements.

35. A device according to claim 1, wherein both the measure and reference elements are contained on the same planar substrate and the substrate is provided with thermal breaks between the measure and reference sections to optimise the thermal resistance between measure and reference elements for the required device performance.

36. A device according to claim 1, comprising thermistors and/or Peltier coolers to provide heating and/or cooling to the measure and reference elements.

37. A device according to claim 1, including temperature sensors to independently measure the temperature of the measure element and of the reference element, and means for generating a signal which is indicative of the temperature difference between measure and reference elements, said temperature difference being indicative of the fluid flow rate.

38. A device according to claim 1, including a plurality of measure and reference elements.

39. A device according to claim 38, including means for averaging signals derived using the plurality of measure and reference elements.

40. A device according to claim 1, wherein the measure cell is heated or cooled to a fixed temperature.

41. A device according to claim 1, wherein the measure cell is equipped with an ambient temperature sensor for temperature compensation of the signal.

42. A device according to claim 1, wherein the measure cell is equipped with an ambient temperature sensor and heater band for active temperature control of the measurement cell.

43. A device according to claim 1, wherein at least one of the measure cell, inlet means or outlet means includes flow modifying elements to vary the thermal transfer efficiency from the measure element to the incident fluid flow.

44. A device according to claim 1, wherein the measure cell includes a flow isolating element to provide isolation of the reference element from the direct fluid flow, said flow isolating element being adapted to allow fluid diffusion to occur.

45. A device according to claim 1, wherein the distance between the measure element and the measure cell wall is adjustable to achieve measurement with a desired flow range and sensitivity.

* * * * *